(12) United States Patent
Cohen et al.

(10) Patent No.: US 12,534,368 B2
(45) Date of Patent: Jan. 27, 2026

(54) PRODUCTION OF POTASSIUM PHOSPHATES

(71) Applicant: EasyMining Sweden AB, Sollentuna (SE)

(72) Inventors: Yariv Cohen, Stockholm (SE); Christian Tunsu, Askim (SE); Angela Van Der Werf, Solna (SE); Daniel Boman, Uppsala (SE)

(73) Assignee: EASYMINING SWEDEN AB, Sollentuna (SE)

( * ) Notice: Subject to any disclaimer, the term of this patent is extended or adjusted under 35 U.S.C. 154(b) by 665 days.

(21) Appl. No.: 18/008,920

(22) PCT Filed: Jun. 11, 2021

(86) PCT No.: PCT/SE2021/050560
§ 371 (c)(1),
(2) Date: Dec. 7, 2022

(87) PCT Pub. No.: WO2021/251891
PCT Pub. Date: Dec. 16, 2021

(65) Prior Publication Data
US 2023/0234849 A1 Jul. 27, 2023

(30) Foreign Application Priority Data
Jun. 12, 2020 (SE) .................... 2050703-4

(51) Int. Cl.
*C01B 25/30* (2006.01)
*C05B 7/00* (2006.01)

(52) U.S. Cl.
CPC .............. *C01B 25/306* (2013.01); *C05B 7/00* (2013.01)

(58) Field of Classification Search
None
See application file for complete search history.

(56) References Cited

U.S. PATENT DOCUMENTS 3,993,733 A 11/1976 Irani
4,112,118 A 9/1978 Cussons et al.
(Continued)

FOREIGN PATENT DOCUMENTS

CN 108609592 A 10/2018
EP 0176613 A1 * 4/1986 ........... C01B 25/461
(Continued)

OTHER PUBLICATIONS

Yanming Quan; Phosphate & Compound Fertilizer, Purification of WPA and its salt production technology; China Academic Journal Electronic Publishing House; (English translation of the abstract only provided); http://www.cnki.net; 2010; 4 pages.
(Continued)

*Primary Examiner* — Keling Zhang
(74) *Attorney, Agent, or Firm* — Harness, Dickey & Pierce, P.L.C.; Anthony G. Fussner

(57) ABSTRACT

An arrangement for production of fully soluble, pure and well-defined mono- or di-potassium phosphates, comprises an extraction section, a stripping section and end treatment arrangements. The extraction section performs a liquid-liquid extraction of phosphate between a feed liquid comprising phosphoric acid. The stripping section performs a liquid-liquid extraction of phosphate between solvent loaded with phosphate and a strip solution. The solvent depleted in phosphate is recirculated to the extraction section for further extraction of phosphate. The strip solution is an aqueous potassium phosphate solution. The end treatment arrangements comprise a source of potassium base, an adding arrangement, a cooling arrangement, a precipitate remover and a recirculation system.

12 Claims, 16 Drawing Sheets

(56) References Cited

U.S. PATENT DOCUMENTS

| | | | |
|---|---|---|---|
| 4,132,540 | A | 1/1979 | Edwards et al. |
| 4,311,681 | A | 1/1982 | Chiang et al. |
| 4,678,650 | A | 7/1987 | Gradl et al. |
| 4,751,066 | A | 6/1988 | Hall et al. |
| 9,738,522 | B2 | 8/2017 | Cohen et al. |

FOREIGN PATENT DOCUMENTS

| | | |
|---|---|---|
| GB | 636035 A | 4/1950 |
| WO | WO-2008/115121 A1 | 9/2008 |
| WO | WO-2010/138045 A1 | 12/2010 |
| WO | WO-2013/191639 A1 | 12/2013 |
| WO | WO-2014/002097 A1 | 1/2014 |

OTHER PUBLICATIONS

International Search Report and Written Opinion for PCT/SE2021/050560 filed Nov. 6, 2021 that is the parent application to the instant application; dated Aug. 8, 2021; 10 pages.

Chenghong et al., Chemical Experimental Technology, 4k Publishing House, 2007; 3 pages.

* cited by examiner

PRODUCTION OF POTASSIUM PHOSPHATES

This patent application is a U.S. national stage filing under 35 U.S.C. § 371 of PCT International Application No. PCT/SE2021/050560 filed Jun. 11, 2021 (published as WO2021/251891 on Dec. 16, 2021), which claims priority to and the benefit of Swedish Application No. 2050703-4 filed Jun. 12, 2020. The entire contents of these applications are incorporated herein by reference.

TECHNICAL FIELD

The present invention relates in general to production of potassium phosphates from phosphorus-containing solutions and in particular to production of potassium phosphates from a feed liquid comprising phosphoric acid.

BACKGROUND

All water-soluble phosphate salts such as soluble fertilizers are derived from phosphoric acid. Phosphoric acid is produced commercially by either a 'wet' or a thermal process. Wet digestion of phosphate rock is the most common process. Thermal processing is energy intensive and therefore expensive. For that reason, quantities of acid produced thermally are much smaller and mainly used for production of industrial phosphates.

Phosphoric acid for fertilizer production is almost solely based on wet digestion of rock phosphate. The process is mainly based on dissolution of apatite with sulfuric acid. After dissolution of the rock, calcium sulfate (gypsum) and phosphoric acid are separated by filtration. To produce merchant-grade phosphoric acid, high acid concentrations are required and water is evaporated. Calcium sulfate exists in a number of different crystal forms depending on the prevailing conditions such as temperature, phosphorus concentration in the slurry, and level of free sulfate. Calcium sulfate is either precipitated as di-hydrate ($CaSO_4 \cdot 2H_2O$) or as hemi-hydrate ($CaSO_4 \cdot \frac{1}{2}H_2O$). Phosphoric acid produced through this process is characterized by a relatively low purity.

For deriving potassium phosphate salts, merchant-grade phosphoric acid, having a concentration of about 54% $P_2O_5$, is neutralized with potassium hydroxide (KOH) or potassium carbonate ($KHCO_3$ or $K_2CO_3$) to form either mono-potassium phosphate (MKP, $KH_2PO_4$, also named potassium dihydrogenphosphate, KDP) or di-potassium phosphate (DKP, also named dipotassium hydrogen orthophosphate or potassium phosphate dibasic). Di-potassium phosphate has the formula $K_2HPO_4 \cdot (H_2O)_x$ (x=0, 3, 6) and is produced by controlling the KOH-to-phosphoric acid mole ratio during the neutralization process. MKP and DKP are often used as a fertilizer, food additive, and buffering agent.

The neutralization of merchant-grade phosphoric acid with potassium hydroxide or potassium carbonate is an exothermic reaction.

Potassium phosphates are considered a high value fertilizer. Plants need potassium for many reasons. Potassium makes enzyme activity possible in plants. It also encourages respiration, transpiration and makes plants capable of absorbing other vital nutrients. Potassium is also a key player in the transportation of water and nutrients in the xylem of the plant. A healthy supply of potassium is critical to the operation of the plant's transport systems. A healthy plant with a sufficient potassium supply can also increase root growth and helps stop the growth and spread of plant diseases. The common source of potassium for fertilizers is potassium chloride (KCl) since it is recovered in that form from ores and natural brines. However, plant species vary greatly in their susceptibility to high chloride concentrations in the soil solution and four main groups in this respect can be distinguished: a) chloride loving crops, b) chloride tolerant crops, c) partly chloride tolerant crops, and d) chloride sensitive crops.

Chloride-sensitive crops include many fruit and vegetable varieties, and special crops such as hops or tobacco. For these crops potassium chloride cannot be used as a fertilizer and the chloride anion has to be replaced with a sulfate or phosphate anion. Phosphorus is an important plant nutrient. Without phosphorus, photosynthesis could not occur. Phosphorus plays a key role in complex energy transformations that are necessary to all life, as a main ingredient in ATP (adenosine triphosphate). It is also a central component of DNA and RNA—and is necessary for building proteins and other compounds. It is an ingredient of the cell membrane and has a central part in regulation of pH in the plant cell. Phosphorus is required by the plant from the seedling stage through to maturity—and has a measurable impact on crop quality and yield. Phosphorus aids in plant growth and plant health by the following mechanisms: a) enables photosynthesis (energy transformation), b) builds nucleic acids, proteins, and enzymes, c) facilitates root growth, d) strengthens stems and stalks, e) improves flower formation and seed production, f) promotes crop uniformity, g) contributes to earlier maturity, h) increases disease resistance, i) improves overall crop quality and j) facilitates nitrogen fixation abilities of legumes.

Due to the described above, potassium phosphates are very valuable fertilizers since they are composed of both potassium and phosphorus and do not contain any chloride.

For several applications such as fertigation, i.e. the application of water-soluble fertilizers in the irrigation water, and foliar fertilization, i.e. spraying fertilizers on leaves, there is a need for fully-soluble potassium phosphates to avoid clogging of the fertigation equipment by non-dissolved solids. Wet-process phosphoric acid contains a substantial amount of impurities such as iron, aluminum, calcium, magnesium, cadmium, etc. which form water-insoluble solids upon neutralization with potassium hydroxide or potassium carbonate and thus fertilizer-grade potassium phosphates are not completely water-soluble. Therefore, fully-soluble P fertilizers for fertigation purposes must be specially produced from purified phosphoric acid which means additional processing.

The current technology for phosphoric acid purification is based on extraction of impure wet-process phosphoric acid into an organic solvent (ketones, tri-alkyl phosphates, alcohols, etc.) followed by back extraction with water forming a pure phosphoric acid but with a lower concentration, which is thereafter concentrated by water evaporation. Purified phosphoric acid is thereafter neutralized with potassium hydroxide or potassium carbonate forming fully-soluble potassium phosphate products according to the procedure described above.

The disadvantages of the state-of-the art technologies for production of potassium phosphates are numerous. The phosphoric acid as produced from the gypsum filter, in a dihydrate process, is not suitable for direct manufacture of potassium phosphate salts. The acid must be further concentrated by water evaporation to a suitable phosphoric acid concentration (usually about 54% $P_2O_5$). Normally, concentration of phosphoric acid is done in three stages. The acid from the filter (28% $P_2O_5$) is evaporated to 40% $P_2O_5$ in a single stage vacuum evaporator. The acid is then clarified to remove precipitated solids and the clarified acid is then concentrated to 54% $P_2O_5$ in two stages. The inter-stage concentration is about 48% $P_2O_5$. The 54% $P_2O_5$ acid is used for potassium phosphate production according to the procedure described above.

To concentrate acids through evaporation is a very energy-intensive process. The amount of steam required for concentrating phosphoric acid usually varies between 2.5-5 tons of steam per ton of phosphorus, depending on production conditions. If the phosphoric acid is purified by solvent extraction the energy demand is about 7 tons steam per ton of phosphorus. The energy demand for concentration of phosphoric acid is a major production cost. Expensive equipment such as steam distribution systems, evaporators, effluent gas scrubbers, condensation systems, cooling water systems, liquid effluent treatment systems and acid storage facilities are necessary for production of merchant-grade phosphoric acid. About 50 tons of cooling water is required in order to condense one ton of vapor. In a barometric condenser the vapor is directly contacted by the water and, as a result, impurities in the vapor contaminate the cooling water which results in large quantities of contaminated effluents. Furthermore, additional equipment is needed for the neutralization of phosphoric acid with potassium hydroxide or potassium carbonate. Production of potassium phosphate of technical quality requires additional processing steps as described above.

U.S. Pat. No. 4,132,540 describes a process for removing solvent from the raffinate of extracted phosphoric acid. Residual solvent is removed from the raffinate by addition of ammonium or alkali or alkaline earth metal cations in an atomic ratio to phosphorus of between 0.1:1 and 0.6:1.

U.S. Pat. No. 4,311,681 describes a process for separation of impurities such as silica and organic impurities from an organic solvent by washing with an aqueous alkali orthophosphate solution sufficient to maintain the pH of the solvent-aqueous mixture at from about 9.5 to about 12.5

U.S. Pat. No. 4,678,650 describes a process for production of an aqueous alkali phosphate solution by mixing an aqueous phase containing an alkali compound with an organic phase containing phosphoric acid in a volume ratio larger than 1:1, and thereafter separating the resulting aqueous alkali phosphate solution from the organic phase.

U.S. Pat. No. 4,751,066 describes a process for the alkaline stripping of wet process phosphoric acid from a water immiscible organic solvent in order to produce a sodium phosphate solution.

U.S. Pat. No. 4,112,118 describes a process for stripping phosphoric acid from an organic solvent with a basic compound of ammonia, sodium or potassium being anhydrous or with water in an amount of up to 10 moles or with a solid dihydrogen phosphate salt, to give a liquid phase mixture comprising an organic solvent phase substantially free of phosphoric acid and an aqueous phase comprising dissolved phosphoric acid and dissolved dihydrogen phosphate of the base. One main disadvantage of the process is that the stripping process requires that the organic solvent is loaded with a highly concentrated phosphoric acid solution of >60% weight. The process thus requires concentration of phosphoric acid by water evaporation, equipment such as evaporators, steam distribution systems, etc., as well as, an energy source. Another main disadvantage of the process is that the product is an aqueous solution which requires further treatment.

SUMMARY

A general object of the present invention is to produce fully soluble, pure and well-defined mono or di-potassium phosphate avoiding problems with the prior art. Additional objects are discussed in connection with the different embodiments presented further below.

The above objects are achieved by methods and devices according to the enclosed independent patent claims. Preferred embodiments are defined by the dependent patent claims.

In general words, in a first aspect, a method for production of pure potassium phosphates comprises extracting of phosphate from a feed liquid, comprising phosphoric acid, by a liquid-liquid extraction into a solvent. The solvent is stripped of at least a part of the phosphate by a liquid-liquid extraction into a strip solution. The strip solution is an aqueous potassium phosphate solution. The strip solution, loaded with stripped phosphate, and the solvent, at least partially depleted in phosphate, are separated. The solvent, at least partly depleted in phosphate, is recirculated for further extraction of phosphate in the extracting step. A potassium base is added into at least a partial stream of the strip solution. Heat, generated when said potassium base is added into the at least a partial stream of the strip solution, is cooled off. Crystals are removed from the loaded strip solution. The strip solution is recirculated after the step of removing crystals for use as strip solution input in the stripping process.

In a second aspect, an arrangement for production of pure potassium phosphates comprises an extraction section, a stripping section and an end treatment arrangement. The extraction section is configured for performing a liquid-liquid extraction of phosphate between a feed liquid comprising phosphoric acid and a solvent. The extraction section has a first extraction inlet for provision of the feed liquid, a second extraction inlet for provision of the solvent, a first extraction outlet for delivering of the feed liquid at least partly depleted in phosphate and a second extraction outlet for delivering of the solvent loaded with phosphate. The stripping section is configured for performing a liquid-liquid extraction of phosphate between the solvent loaded with phosphate and a strip solution. The stripping section has a first stripping inlet, connected to the second extraction outlet, for provision of the solvent loaded with phosphate, a second stripping inlet for provision of input strip solution, a first stripping outlet for delivering the solvent at least partly depleted in phosphate and a second stripping outlet for delivering output strip solution. The first stripping outlet is connected to the second extraction inlet for recirculating the solvent at least partly depleted in phosphate for further extraction of phosphate. The strip solution is an aqueous potassium phosphate solution. The end treatment arrangement is connected to the second stripping outlet and comprises a source of potassium base, an adding arrangement, a cooling arrangement, a precipitate remover and a recirculation system. The adding arrangement is connected to the source of potassium and is configured for adding potassium base from the source of potassium base into at least a partial stream of the strip solution. The cooling arrangement is configured for cooling off heat generated from the chemical reaction when the potassium base from the source of potassium base is added into the at least a partial stream of the strip solution. The precipitate remover is configured for separating crystals from the loaded strip solution. The recirculating system is connected between an outlet from the precipitate remover and the second stripping inlet of the stripping section. The recirculating system is configured for reusing strip solution from the precipitate remover as input strip solution.

One advantage with the present invention is that well defined fully soluble, pure and well-defined mono- or di-potassium phosphate are possible to produce in an industrially applicable process in an efficient and economic manner. Additional advantages are discussed in connection with the different embodiments presented further below.

BRIEF DESCRIPTION OF THE DRAWINGS

The invention, together with further objects and advantages thereof, may best be understood by making reference to the following description taken together with the accompanying drawing and tables in which.

DETAILED DESCRIPTION

Figure 1:
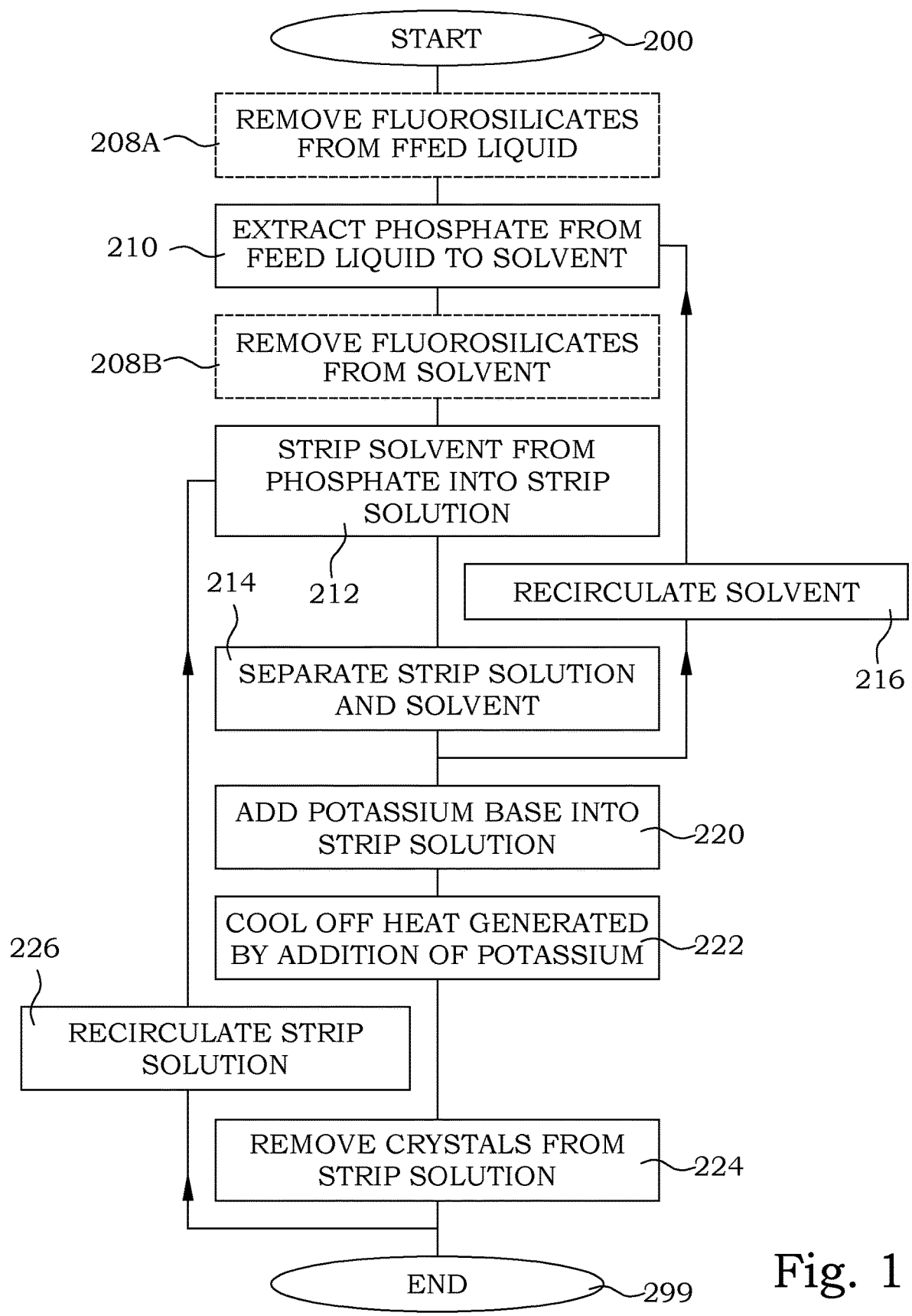
FIG. 1 is a flow diagram of steps of an embodiment of a method for production of potassium phosphates.

Some often used terminology in the present disclosure is to be interpreted as follows:

Solvent—A liquid phase, typically organic, which preferentially dissolves extractable solute species from an aqueous solution.

Extractant—An active component, typically organic, of a solvent enabling extraction.

Solvent extraction (liquid liquid extraction)—The separation of one or more solutes from a mixture by mass transfer between immiscible phases in which at least one phase typically is an organic liquid.

Stripping—The displacement from the solvent of the ions or acids removed from the process solution to make the solvent ready for reuse.

Diluent—A liquid, typically organic, in which an extractant is dissolved to form a solvent.

Raffinate—An aqueous phase from which a solute has been removed by extraction.

Strip product—An aqueous phase in which the solute extracted by the solvent is recovered.

An additional object of the present technology is to enable production of solid potassium phosphates without any need for evaporation of water with associated equipment such as evaporators, steam distribution systems, etc., as well as, an energy source for heat production. To this end, the present disclosure is based on extraction of phosphoric acid with a water—immiscible or at least substantially water-immiscible solvent.

Several water-immiscible solvents are suggested in the literature as suitable for extraction of phosphoric acid.

The suggested solvents can generally be divided into the following groups: a) alkyl phosphates such as tributyl phosphate, b) amines such as tri-n-octylamine, c) alcohols such as isoamyl alcohol, n-amyl alcohol, cyclohexanol, methyl cyclohexanol, tertiary amyl alcohol, isobutanol, n-butanol, heptanol, d) ketones such as methyl-isobutyl ketone, methyl propyl ketone, diethyl ketone, methyl ethyl ketone, methyl-n-butyl ketone, e) amides such as butyl acetamide, f) aldehydes such as benzaldehyde, g) esters such as ethyl acetate, butyl acetate, amyl acetate, cyclohexanone, h) ethers such as diethyl ether, di-n-amyl ether, and glycol ethers such as di-ethylene glycol.

All the above-mentioned solvents are classified as water immiscible. However, most of the mentioned solvents have in fact a relatively high solubility in water which may result in contamination of both aqueous streams and the final product with traces of the solvent. High water solubility usually requires recovery of dissolved solvent from aqueous steams by distillation which is costly and complex. For example, n-butanol has a water solubility of ca 90 grams per liter at room temperature. Several of the mentioned solvents have other disadvantages in addition to high solubility such as flammability and subjection to explosion risk, e.g. di-isopropyl ether.

Furthermore, several of the mentioned solvents show very little extraction capacity for phosphoric acid below a specific threshold concentration. This means that the feed phosphoric acid must initially have a high concentration, which usually requires concentration of the acid by water evaporation. In addition, only partial extraction of phosphoric acid is possible with such solvents. A typical example for a solvent with threshold concentration for phosphoric acid extraction is methyl isobutyl ketone. In general, ethers, esters and selected ketones have a threshold concentration for phosphoric acid extraction and are therefore unsuitable for extracting phosphate from low concentration sources.

Tributyl phosphate is commonly used in the phosphate industry for purification of phosphoric acid by liquid-liquid extraction. Tributyl phosphate is non-flammable, has low toxicity and very low solubility in water of ca 0.4 grams per liter at room temperature. Furthermore, the solubility decreases with increasing temperature. Tributyl phosphate has also a reasonably constant distribution coefficient, i.e. ability for extracting phosphoric acid, down to low phosphoric acid concentration. Due to the relatively high density of tributyl phosphate it is commonly mixed with a diluent, such as, aliphatic kerosene in order to improve the physical separation of the immiscible phases.

Tributyl phosphate enables extraction of phosphoric acid in preference to dissolved salts such as chlorides or sulfates, and in preference to dissolved acids such as hydrochloric acid or sulfuric acid. The presence of dissolved salts or acids enhances extraction of phosphoric acid by a salting out mechanism which can enable almost complete extraction of phosphoric acid.

However, tributyl phosphate extracts nitric acid in preference to phosphoric acid which makes selective extraction of phosphoric acid from nitric acid impossible. In general, solvents, which have a low solubility in water, extract nitric acid in preference to phosphoric acid. Solvents with increased selectivity for phosphoric acid such as amyl alcohol have high water solubility and still co-extract considerable amounts of nitric acid. The main advantage of using tributyl phosphate as a solvent for extraction of phosphoric acid is that the low water solubility enables to operate without a need for distilling the solvent from aqueous streams which is costly and complex.

It was mentioned above that most of the suitable solvents have a relatively high solubility in water, e.g. most alcohols. However, alcohols having relatively long carbon chains also have a relatively low water solubility. An alternative solvent for extracting phosphoric acid is therefore long carbon chain alcohols, e.g. heptanol, having a solubility in water of less than 2%, and preferably less than 1%. If the solubility is lower than such a level, the amount of solvent following the water stream becomes reasonably low to be taken care of by not too expensive and complex arrangements.

Extraction of phosphoric acid with a water—immiscible solvent has previously been used for production of ammonium phosphates.

The international patent application WO 2008/115121 discloses a method and an arrangement for phosphorus recovery. Phosphorus ions are extracted from solutions by adsorbing phosphorus ions in a scavenger and by releasing the phosphorus ions into an eluate during regeneration of the scavenger. The regeneration is performed by ammonia. Phosphate anions are precipitated in form of tri-ammonium phosphate upon introduction of excess amounts of ammonia. The ammonia remaining in solution after the precipitation of tri-ammonium phosphate is reused for regenerating the scavenger. Unfortunately, tri-ammonium phosphate is unstable at ambient temperature and atmospheric pressure resulting in the decomposition of the crystal accompanied with release of ammonia which requires further processing into stable forms of ammonium phosphate. Tri-ammonium phosphate is not suitable for direct use in agriculture.

GB 636,035 discloses improvements of processes of producing diammonium phosphate. Crystals of mono-ammonium phosphate are introduced into a solution of diammonium phosphate in a reactor and anhydrous ammonia is fed into the reactor. Diammonium phosphate crystals are collected at the chamber bottom.

The international patent application WO 2010/138045, assigned to the present assignee, describes a process comprising addition of ammonia to a phosphorus-loaded water immiscible liquid phase in order to precipitate ammonium phosphates. The precipitated ammonium phosphates are washed with saturated aqueous solution of ammonium phosphate and the washed crystals are dried. Residual scavenger washed form the crystals is separated by a phase separation of the scavenger and the saturated aqueous solution of ammonium phosphate and the separated residual scavenger is reused for further adsorbing of phosphorus to be reused for further extraction. The washing liquid depleted from residual scavenger is reused for further washing of the crystals. A disadvantage is the need for three phase separation.

The U.S. Pat. No. 9,738,522B2, assigned to the present assignee, discloses a method for production of ammonium phosphates.

Another object of the present technology is to instead enable production of solid potassium phosphates by use of liquid-liquid extraction in a robust way enabling efficient recirculation of process liquids.

The present invention is therefore based on the process of stripping a solvent loaded with phosphoric acid with a solution of potassium phosphate. Since stripping with a mono-potassium phosphate solution is based on extraction equilibrium, complete stripping of phosphoric acid from the solvent may require more than a single contact stage. However as will be shown later in the description, stripping with a mono-potassium phosphate solution is very efficient.

In general, due to a higher density, stripping with mono-potassium phosphate was found to be considerably superior to conventional stripping with water regarding separation time and completeness of the separation.

One advantage of using mono-potassium phosphate for stripping is that stripping in most embodiments involves only two phases, one organic and one aqueous, without formation of any precipitates. This enables to operate with conventional liquid-liquid extraction equipment such as pulsed-columns, mixer settlers or any other liquid-liquid extraction equipment such as, agitated columns, non-agitated columns, inline mixers, centrifugal contactors, etc.

Based on the above presented surprising results, an advantageous arrangement for production of pure potassium phosphates can be outlined. The arrangement involves an extraction section, a stripping section and an end treatment arrangement. The different parts are intimately interdependent regarding composition of the used liquids. The extraction section performs a liquid-liquid extraction of phosphate between a feed liquid, comprising phosphoric acid, and a solvent. The solvent has preferably a solubility in water of less than 2%. This enables production of potassium phosphate precipitates with satisfying levels of adhering solvent. The stripping section performs a liquid-liquid extraction of phosphate between the solvent, loaded with phosphate, and a strip solution. The phosphate-depleted solvent is connected back to the extraction section for further extraction of phosphate. The strip solution is an aqueous potassium phosphate solution. By such arrangements, a strip solution loaded with phosphate is provided in a manner suitable for industrial production. The loaded strip solution is then treated in different manners in order to obtain well defined MKP and/or well-defined DKP. Such end treatment arrangement utilizes a source of potassium base (e.g. KOH). An adding arrangement is connected to the source of potassium base and adds the potassium base into at least a partial stream of the strip solution that exited from the stripping section. Heat is generated from the chemical reaction occurring when the potassium base is added, and a cooling arrangement is therefore provided for removing that heat. The arrangement also comprises a precipitate remover which separates crystals of MKP or DKP from the loaded strip solution. Finally, a recirculating system is connected between the precipitate remover and the stripping section for enabling reuse of strip solution from the precipitate remover as input strip solution in the stripping section.

The present approach disclosed here above enables production of clean and well-defined mono- or di-potassium phosphate in one and the same plant without a need for concentrating phosphoric acid by water evaporation. This is obtained by a combination of liquid-liquid extraction and chemical precipitation by which emulsions and crude formation due to non-settling precipitates are avoided due to specific properties of the strip solution and/or solvent. In preferred embodiments, operational problems such as formation of precipitates during stripping of the solvent, production of potassium phosphate precipitates with unsatisfying levels of adhering solvent, are additionally avoided.

In U.S. Pat. No. 9,738,522 B2 a process for production of water-soluble ammonium phosphates was disclosed. As discussed before, potassium phosphate is a valuable special fertilizer for certain crops. In addition, to produce potassium phosphate instead of ammonium phosphate has other advantages. Ammonia is a toxic gas so handling of ammonia requires special care and it can be difficult to get permits for handling ammonia in certain sites. Handling of a potassium base is much easier since there is no gaseous phase involved. In several phosphoric acid plants there is no handling of ammonia on-site and production of potassium phosphates instead of ammonium phosphate becomes easier with regard to permits, logistics, storage and transportation.

The patent U.S. Pat. No. 9,738,522 B2 discloses a process for production of ammonium phosphates by combining liquid-liquid extraction and chemical precipitation of ammonium phosphate. In that disclosed method the solvent loaded with phosphoric acid is stripped with an ammonium phosphate strip solution to obtain an ammonium phosphate solution containing stripped phosphoric acid. However, when testing the same approach for recovering potassium phosphates, an emulsion occurred in many cases that rendered the process non-operable. After extensive investigation, the cause for the problem was revealed.

A tributyl phosphate solvent can extract fluorosilicic acid together with phosphoric acid. Once the solvent loaded with both fluorosilicic acid and phosphoric acid is stripped with a potassium phosphate solution, a precipitate of potassium fluorosilicate is formed that causes a crude/emulsion. This happens due to the very low solubility of potassium fluorosilicates. In contrast, ammonium fluorosilicates have a high water-solubility and therefore similar problems did not occur in the process of U.S. Pat. No. 9,738,522 B2.

These findings lead to the conclusion that the basic process described above is indeed operable on feed liquids free from fluorosilicates.

However, for feed liquids comprising fluorosilicates, the solution to this technical problem is to reduce the content of fluorosilicates in the solvent at least before stripping with potassium phosphate. This can be done by reducing the fluorosilicate content of the original aqueous feed solution to the extraction step or by reducing the fluorosilicate content from the loaded solvent itself as is described in the examples further in the description. After reduction of the fluorosilicate content, or if the feed liquid in itself is substantially free from fluorosilicate, the loaded solvent has preferably a flurosilicate content of below 0.3 M, and most preferably below 0.001 M FIG. 1 illustrates a flow diagram of steps of a method for production of pure potassium phosphates. The procedure begins in step 200. In step 210, phosphate is extracted, from a feed liquid comprising phosphoric acid, into a solvent. The extraction is preferably performed by a liquid-liquid extraction. The solvent has a solubility in water of preferably less than 2%. The solvent is in step 212 stripped of at least a part of the phosphate content by a liquid-liquid extraction, into a strip solution. The strip solution comprises potassium phosphate. The strip solution, loaded with stripped phosphate, and the solvent, at least partially depleted in phosphate, are separated in step 214. In step 216, the solvent, at least partly depleted in phosphate, is recirculated for further extraction of phosphate in the extracting step 210.

In step 220, potassium base (e.g. KOH) is added into at least a partial stream of the strip solution. In step 222, heat, generated when the potassium base is added into the at least a partial stream of the strip solution, is cooled off, entirely or partly. Crystals from the loaded strip solution are removed in step 224. In the figure, the steps 220-224 are illustrated as being subsequent steps. However, since they describe different circulating processes, their relative dependencies in time and process liquids may differ from embodiment to embodiment. All steps 220-224 are, however, performed in all embodiments in one way or another. In step 226, the strip solution is recirculated after the step of removing the crystals 224 for use as strip solution input in the step of stripping 212. The procedure ends in step 299.

In applications, where the feed liquid comprises fluorosilicates, processes for removing fluorosilicate are preferably included. In one embodiment, a step 208A of removing fluorosilicate from the feed liquid is performed before the step 210 of extracting phosphate. This step removes or at least significantly reduces the content of fluorosilicates in the feed liquid. Different embodiments of this process are discussed in connection with the examples further below. In another embodiment, a step 208B of removing fluorosilicate from the stream of the water-immiscible solvent loaded with phosphoric acid is performed. This step therefore takes place after step 210, where the phosphate is extracted together with some fluorosilicates, but before step 212 of stripping the solvent. Such a step may preferably be combined with e.g. any scrubbing procedures. The step 208B removes or at least significantly reduces the content of fluorosilicates in the water-immiscible solvent loaded with phosphoric acid. Different embodiments of this process are discussed in connection with the examples further below.

A number of embodiments of the present ideas will be presented here below in order to describe the advantages and variety possibilities.

Figure 2:
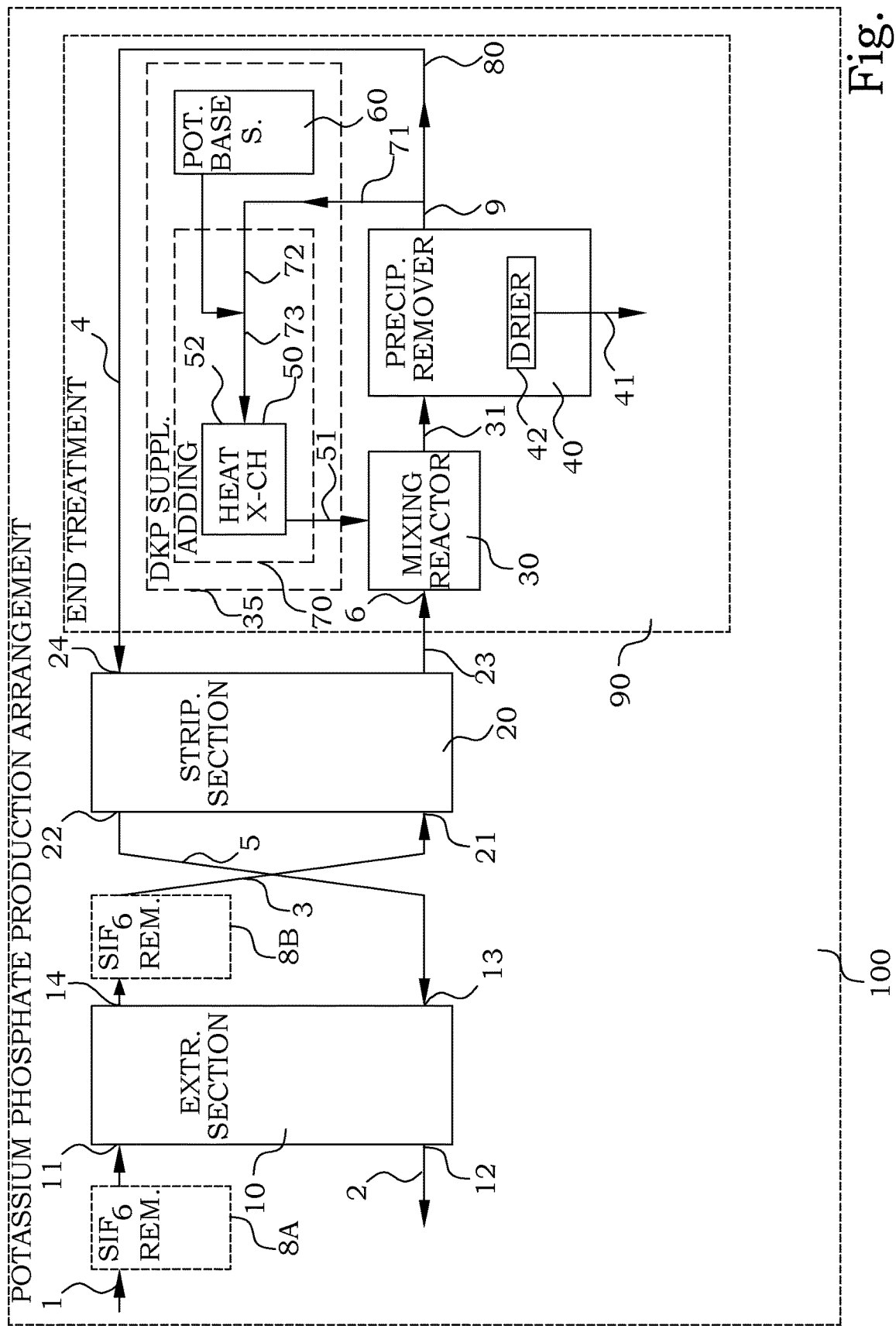
FIG. 2 is a block scheme of an embodiment of an arrangement for production of mono-potassium phosphate.

Embodiments of an arrangement 100 for production of pure potassium phosphates, in this embodiment mono-potassium phosphate, is illustrated in FIG. 2. A phosphoric-acid-containing feed liquid 1 is fed to an extraction section 10 configured for performing a liquid-liquid extraction of phosphate between the feed liquid 1 and a solvent 5. The solvent 5 is water-immiscible and has a solubility in water preferably of less than 2%. The water-immiscible solvent 5 is in this particular embodiment tributyl phosphate in aliphatic kerosene.

The phosphoric acid feed liquid 1 is typically obtained by digesting a phosphorus containing material with a mineral acid. The phosphorus containing material can be rock phosphate or other phosphorus containing material such as phosphorus rich ashes such as ash of incinerated sewage sludge, ash of incinerated slaughterhouse waste, ash of manure, etc. The mineral acid used for digestion should preferably be of sulfuric acid, hydrochloric acid, nitric acid or phosphoric acid in order to obtain a selective extraction of phosphoric acid.

The concentration of phosphoric acid in the leach solution can be very low, such as below 7% $P_2O_5$ or even below 4% $P_2O_5$. Dilute phosphoric acid solutions are typical for sludge ash leach solutions. When processing dilute leach solutions, it is an advantage that the solution also contains dissolved salts or acids which are not extracted in preference to phosphoric acid but have a salting out effect which enables almost complete extraction of phosphoric acid at low concentrations. Leach solutions with higher phosphoric acid concentration can, of course, be processed according to the invention. There is no limit on the maximum concentration of phosphoric acid.

In alternative embodiments, the phosphoric acid feed liquid 1 can be provided in other ways. The particular way in which the phosphoric acid feed liquid 1 is provided does not substantially influence the main ideas in the present disclosures and is therefore not further discussed. The only detail of interest is the content of fluorosilicates in the feed liquid, as will be discussed further below.

Since the main object of the ideas presented in the present disclosure is to enable production of potassium phosphates without any need for concentrating phosphoric acid by water evaporation, it is obvious and most beneficial that the concentration of phosphoric acid is the maximum concentration practically possible to obtain by digestion with an acid. Phosphate rock digestion with sulfuric acid according to the di-hydrate process typically results in a phosphoric acid concentration of about 28% $P_2O_5$. The aqueous leach solution is optionally pretreated to remove ionic compounds such as iron, fluorine, etc.

The extraction section 10 has a first extraction inlet 11 for provision of the feed liquid 1, and a second extraction inlet 13 for provision of the solvent 5. The extraction section 10 has also a first extraction outlet 12 for delivering of the raffinate or feed liquid 2 at least partly depleted in phosphate, and a second extraction outlet 14 for delivering of the solvent 3 loaded with phosphate.

As previously discussed, any organic solvent capable of removing phosphorus from aqueous solutions can be used. The mechanism of phosphorus extraction can be solvation of phosphoric acid or both ion association and solvation. The composition of the organic solvent should be selected according to the concentration of the phosphoric acid feed, presence of additional acids or salts, etc. in order to obtain a high loading capacity and an effective operational extraction process. Tributyl phosphate in aliphatic kerosene is used as a preferred solvent in the present embodiment.

The temperature of the water-immiscible solvent 5 is preferably below 60° C. since lower temperatures generally favor phosphoric acid extraction.

The liquid-liquid extraction process in the extraction section 10 is preferably a continuous liquid-liquid extraction process using preferably liquid-liquid extraction equipment such as pulsed-columns. However, any other liquid-liquid extraction equipment can be used such as, agitated columns, non-agitated columns, mixer settlers, inline mixers, centrifugal contactors, etc.

The raffinate 2, i.e. the feed liquid which is at least partially depleted in phosphate, is led to further treatment such as reuse for dissolution, etc.

The water-immiscible solvent 3 which is loaded with phosphoric acid is optionally scrubbed with an aqueous solution to remove co-extracted impurities.

The loading of the solvent 3 depends on the concentration of phosphoric acid in the feed liquid 1, concentration of dissolved salts and acids, phase ratio of input water-immiscible solvent 5 to feed liquid 1, as well as, number of contact stages during extraction in the extraction section 10. A special advantage with the present embodiment is that high yield of potassium phosphate production can be obtained even with very low loading of phosphoric acid in the solvent 3. The phosphoric acid loading in the solvent 3 can be below 2% $P_2O_5$ and still high yield of solid potassium phosphate can be obtained by increasing the concentration of phosphoric acid during the stripping process. Of course, the loading of the solvent 3 can be higher. A typical feed solution obtained from digestion of rock phosphate with sulfuric acid according to the di-hydrate process usually results in a phosphoric acid loading of ca 6% $P_2O_5$ in the water-immiscible solvent 3.

Returning to FIG. 2, the phosphorus-loaded water-immiscible solvent 3 is thereafter provided to a stripping section 20. The stripping section 20 is configured for performing a liquid-liquid extraction of phosphate between the solvent 3 loaded with phosphate and a strip solution 4. The strip solution 4 is an aqueous potassium phosphate solution. In the present embodiment, substantially all the potassium phosphate in the input strip solution 4 is monopotassium phosphate.

The stripping section 20 has a first stripping inlet 21, connected to the second extraction outlet 14, for provision of the solvent 3 loaded with phosphate. The stripping section 20 also has a second stripping inlet 24 for provision of input strip solution 4. The stripping section 20 furthermore has a first stripping outlet 22 for delivering the solvent 5 at least partly depleted in phosphate, and a second stripping outlet 23 for delivering output strip solution 6. The first stripping outlet 22 is connected to the second extraction inlet 13 for recirculating the solvent 5 at least partly depleted in phosphate for further extraction of phosphate in the extraction section 10.

The stripping section 20 is preferably a continuous liquid-liquid extraction process using preferably liquid-liquid extraction equipment such as pulsed-columns or mixer settlers. However, any other liquid-liquid extraction equipment can be used such as, agitated columns, non-agitated columns, inline mixers, centrifugal contactors, etc.

When producing mono-potassium phosphate according to the present embodiment, the potassium phosphate solution 4 is preferably a recycled mono-potassium phosphate solution, e.g. having a concentration which slightly below the solubility limit at the operating temperature.

In cases in which the phosphoric acid loading in the solvent is low, the phosphoric acid concentration is increased during the stripping process by using an organic to aqueous phase ratio larger than 1. This requires several contact stages for obtaining complete stripping of phosphoric acid. The phosphoric acid concentration during the stripping process can usually be increased between 2 times up to more than 5 times of the original concentration. The output strip solution 6 is in the present embodiment typically composed of a mixture of $KH_2PO_4$ and $H_3PO_4$ in the case of using a solution of $KH_2PO_4$ for stripping. The output strip solution 6 is provided to an end treatment arrangement 90.

The end treatment arrangement 90 of the present embodiment comprises a source of potassium base 60. Preferably, this could be a source of KOH. Furthermore, an adding arrangement 70 is connected to the source of potassium base 60. The adding arrangement 70 is configured for adding potassium base from the source of potassium base 60 into at least a partial stream 71 of the strip solution. In this embodiment, a part of a strip solution 9 exiting a precipitate remover 40, which will be further described below, is deviated and the potassium base from the source of potassium base 60 is added to that partial stream 71. In the present embodiment, the partial stream 71 comprises a solution of mono-potassium phosphate 72, and by adding the potassium base, the solution is transferred into a solution of di-potassium phosphate 73.

Addition of potassium base to the partial stream 71 of aqueous potassium phosphate solution results in heat generation. This chemical process is thus an exothermic process and in the present embodiment used for production of mono-potassium phosphate, the resulting solution after addition of potassium base 73 comprises a mixture of $KH_2PO_4$ and $K_2HPO_4$, which furthermore becomes heated. A cooling arrangement 50 is therefore provided, configured for cooling off heat generated when the potassium base from the source of potassium base 60 is added into the partial stream 71 of the strip solution. This heat of neutralization is preferably removed by a heat exchanger 52. A cooled solution of a mixture of mono-potassium phosphate and di-potassium phosphate 51 leaves the cooling arrangement 50.

As will be discussed further below, the solution of a mixture of mono-potassium phosphate and di-potassium phosphate 73 is preferably cooled more than what is given by the addition of potassium base. Addition of potassium base to a saturated $KH_2PO_4$ solution 72 results in considerable increase in the solubility limit of the ionic species in solution as long as the potassium addition is up to a certain level. This enables to cool the potassium phosphate solution 51 to temperature below the temperature of the strip solution 6 without formation of any precipitates. Heat exchange can thus be performed without scale formation on heat exchangers.

Addition of potassium base should preferably be proportional to the phosphate loading in the water immiscible solvent 3. Conductivity decreases and pH level increases with decreasing concentration of phosphoric acid in the solvent. Addition of potassium base can thereby be controlled by monitoring pH and/or conductivity in the solvent 3 with a suitable sensor. Another alternative is to monitor pH and/or conductivity in the strip solution 6 or in the reuse circuit before or after addition of potassium base with suitable sensors.

In alternative embodiments, it is possible to add potassium base from the source of potassium base directly to the strip solution 6 in order to form mono-potassium phosphate from the remaining phosphoric acid. However, neutralization of phosphoric acid with potassium base is highly exothermic and results in significant heat formation which then must be removed in the process. The solubility of potassium phosphates is very temperature dependent. For example, the solubility of mono-potassium phosphate at 20° C. is about 23 g per 100 ml water and at 90° C. the solubility increase to about 84 g per 100 ml water. This implies that if potassium base is added directly to the strip solution 6 containing phosphoric acid, there is no precipitation of potassium phosphates due to a higher solubility at a higher temperature. It is indeed possible to cool the strip solution 6 after addition of potassium base by heat exchange. However, since the solubility of potassium phosphates is temperature dependent this procedure may result in crystallization of potassium phosphates upon heat exchangers which reduces heat exchange efficiency and requires frequent scale removal which is unwanted and makes it difficult to operate continuously.

Therefore, preferably, according to the embodiment of FIG. 2, spontaneous precipitation of mono-potassium phosphate is instead caused upon mixing the strip solution 6 with the recycled and cooled di-potassium phosphate solution 51 in a mixing reactor 30. The kinetics of precipitation can be enhanced with the presence of seed crystals. It was found that if the strip solution 6 and the recycled di-potassium phosphate solution 51 have the same temperature, the temperature increase during precipitation of mono-potassium phosphate is only a few ° C. per molar precipitated phosphate. Compared with a substantial temperature increase for neutralizing the strip solution directly with a potassium base, such a temperature increase is easily handled. As mentioned above, the recycled and cooled di-potassium phosphate solution 51 can be controlled to have a temperature which is lower than the temperature of the strip solution 6, which can compensate for the temperature increase during precipitation of mono-potassium phosphate, obtained by combining the strip solution 6 with the recycled di-potassium phosphate solution 51.

In other words, the cooling arrangement is configured for maintaining a temperature of the loaded strip solution below a saturation temperature for monopotassium phosphate, whereby crystals of monopotassium phosphate are precipitated. The cooling is preferably performed in a stream of potassium phosphate in which precipitation does not occur. In a preferred embodiment, the adding arrangement 70 comprises the cooling arrangement 50. The actual cooling can also be performed in different ways. The cooling arrangement 50 can e.g. operate on the liquid stream into which the potassium base is going to be added, i.e. before the mixing. The cooling arrangement 50, can alternatively or in combination also operate on the liquid stream into which the potassium base has been added. Finally, also the potassium base that is going to be added may be cooled. The cooling arrangement 50 is typically a heat exchange device 52. However, any other alternative cooling arrangements 50 can also be utilized, such as Peltier elements, cooling by heat conduction etc.

In this way, according to the present embodiment, precipitation of mono-potassium phosphate occurs in the mixing reactor 30 without any requirement of cooling the mixing reactor 30 itself. In such a way, crystallization of potassium phosphate upon heat exchangers is avoided, which improves the heat exchange efficiency of the process and makes continuous operation easy and robust without requirement for frequent scale removal from heat exchangers.

The slurry 31 exiting the mixing reactor 30 is composed of $KH_2PO_4$ crystals in a saturated $KH_2PO_4$ solution. The slurry 31 exiting the mixing reactor 30 is fed to the earlier mentioned precipitate remover 40. The precipitate remover 40 is configured for separating crystals 41 from the loaded strip solution 31 exiting the mixing reactor 30. Separation can be done by any solid-liquid separation technique such as filtration, settling, centrifugation, etc.

In other words, end treatment arrangements 90 comprise a dipotassium phosphate supplying arrangement 35 and a mixing reactor 30. The mixing reactor 30 is connected to the second stripping outlet 23 of the stripping section 20 and the dipotassium phosphate supplying arrangement 35. The mixing reactor 30 is configured for mixing a dipotassium phosphate solution into the output strip solution 6 from the stripping section 20. In this embodiment, the cooling arrangement 50 is configured for maintaining a temperature of the solution 31 leaving the mixing reactor 30 below a saturation temperature for monopotassium phosphate. This thereby causes crystals of monopotassium phosphate to precipitate from a saturated monopotassium phosphate solution. The precipitate remover 40 is therefore in this embodiment configured for separating crystals of monopotassium phosphate. The dipotassium phosphate supplying arrangement 35 comprises in this embodiment the adding arrangement 70. The adding arrangement 70 comprises in this embodiment an inlet connected to the outlet from said precipitate remover 40 for supply of the partial stream 71 of the strip solution 9 exiting the precipitate remover 40. The adding arrangement is configured for adding the potassium base from the source of potassium base 60 into the partial stream 71 of the strip solution exiting the precipitate remover 40, thereby forming a solution comprising dipotassium phosphate. The adding arrangement is further configured for returning the solution comprising dipotassium phosphate to the dipotassium phosphate mixing reactor 30. The cooling arrangement is configured for maintaining a temperature of the loaded strip solution below a saturation temperature for monopotassium phosphate, whereby crystals of monopotassium phosphate are precipitated.

The separated crystals can be dried in a drier 42 and/or granulated according to known processes forming a final mono-potassium phosphate product. Since the adhering solution is a saturated mono-potassium phosphate solution, the water content in the separated crystals is low. The separated crystals can also be mixed with other ingredients such as nitrogen forming different fertilizer products.

It was found that residual solvent in the precipitated crystals, according to the present embodiment, is very low since it only corresponds to dissolved solvent in the solution adhering to the separated crystals. The water solubility of water-immiscible solvents such as tributyl phosphate is low which results in solvent levels below 20 ppm in the precipitated crystals after separation.

Furthermore, according to a further embodiment, it is possible to remove traces of dissolved solvent from the aqueous solution before the precipitation of potassium phosphates. This can be done by adding an oxidizer such as hydrogen peroxide, etc. in order to oxidize traces of solvent to carbon dioxide and phosphoric acid. In such a manner it is possible even to eliminate the presence of residual solvent in the product. In addition, also if other contaminants such as fluorine etc. are co-extracted with phosphoric acid they can be removed from the strip solution by precipitation, extraction, etc. before precipitation of potassium phosphates.

Returning to the embodiment of FIG. 2, the aqueous potassium phosphate solution 9 exiting the precipitate remover 40 is split into two parts. One partial stream of the aqueous mono-potassium phosphate solution 4 is recycled back to the second stripping inlet 24 of stripping section 20. The arrangement thereby comprises a recirculating system 80 connected between an outlet from the precipitate remover 40 and said second stripping inlet 24 of said stripping section 20, where the recirculating system 80 is configured for reusing strip solution 4 from the precipitate remover 40 as input strip solution. A second partial stream 71 of the aqueous potassium phosphate solution is as mentioned above treated for addition of potassium base.

The amount of potassium base that is introduced into the system is entirely used for creation of the potassium phosphate crystals. In order to achieve an equilibrium in the process, the adding arrangement 70 is preferably configured to add an amount of substance of potassium base to the adding arrangement 70 that is in dependence of an amount of substance of stripped phosphate in the strip solution 6 exiting said second stripping outlet 23 of the stripping section 20. The added amount of substance of potassium base is also dependent on the relative amounts of monopotassium phosphate and/or di-potassium phosphate that are produced, see embodiments described further below.

The objects with the present technology were many. One object is to provide pure potassium phosphates with very low contamination of adhering water-immiscible solvent. Another object of the present invention is to provide a high yield of potassium phosphates by spontaneous precipitation or seeding-induced precipitation without requirement for cooling during precipitation. Yet another object of the present invention is to enable improved phase separation during stripping of phosphoric acid from the solvent. Another object of the present invention is to enable recycling of the solvent without need for further treatment by liquid-liquid extraction or distillation. All these objects were achieved by the embodiment of FIG. 2.

One additional object was also to avoid operational problems such as emulsions and crude formation. In particular, the object was to form a regenerated solvent that do not form precipitates in contact with a potassium phosphate strip solution. In applications, where the feed liquid comprises fluorosilicates, arrangements for removing fluorosilicate are preferably included. In one embodiment, a fluorosilicate remover 8A is provided in the feed liquid stream 1 before the entrance into the extraction section 10. In other words, an outlet of the fluorosilicate remover 8A is connected to the first extraction inlet 11 of the extraction section 10. The fluorosilicate remover 8A is configured for removing or at least significantly reducing the content of fluorosilicates in the feed liquid 1. Different embodiments of this arrangement are discussed in connection with the examples further below. In another embodiment, a fluorosilicate remover 8B is provided in the stream of the water-immiscible solvent 3 loaded with phosphoric acid, before the entrance into the stripping section 20. This may preferably be combined with e.g. any scrubbing arrangements, mentioned earlier. The fluorosilicate remover 8B is configured for removing or at least significantly reducing the content of fluorosilicates in the water-immiscible solvent 3 loaded with phosphoric acid. Different embodiments of this arrangement are discussed in connection with the examples further below.

If di-potassium phosphate is the desired end product, precipitated mono-potassium phosphate can be converted to di-potassium phosphate by feeding the precipitated mono-potassium phosphate and potassium base into a reactor comprising a di-potassium phosphate solution.

Figure 3:
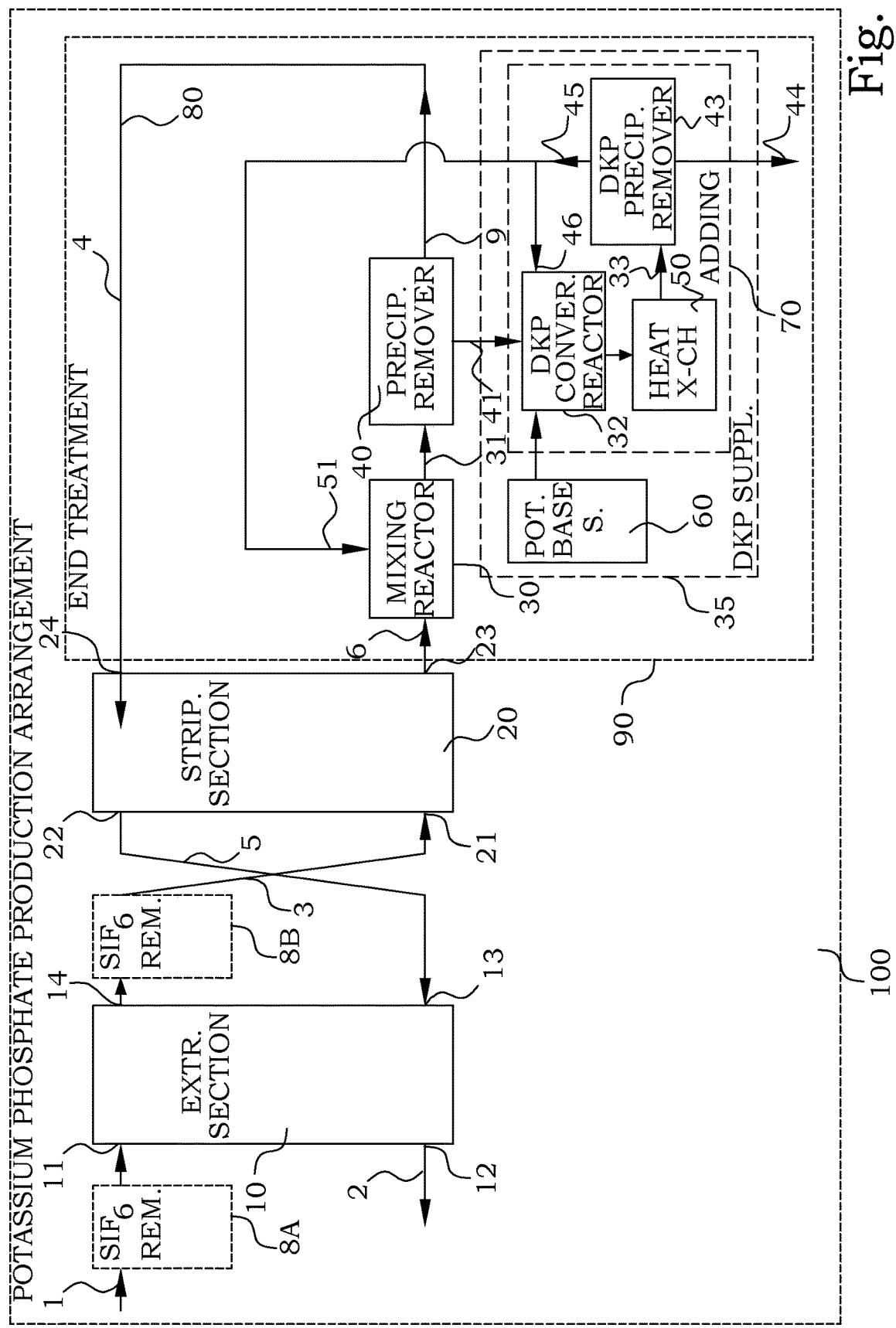
FIG. 3 is a block scheme of an embodiment of an arrangement for production of di-potassium phosphate.

Furthermore, an embodiment of an arrangement for direct production of di-potassium phosphate is illustrated in FIG. 3. The extraction section 10 and the stripping section 20 are the same as presented in FIG. 2, as well as the fluorosilicate removers 8A and 8B, if needed, however, the end treatment arrangements 90 are somewhat modified. The dipotassium phosphate supplying arrangement 35 provides as previous a solution comprising di-potassium phosphate to the mixing reactor 30 for precipitation of mono-potassium phosphate. However, the details of the dipotassium phosphate supplying arrangement 35 are now somewhat different, which will be discussed further below. Precipitated mono-potassium phosphate 41, possibly together with some remaining solution of mono-potassium phosphate, is provided as a slurry to a DKP conversion reactor 32. Potassium base from the source of potassium base 60 is fed into the DKP conversion reactor 32. In other words, dipotassium phosphate supplying arrangement 35 is configured for adding potassium base to a stream originating from the loaded strip solution, e.g. via the precipitate remover 40 as in this embodiment, or direct from the stripping section 20, as discussed in later embodiment. The addition of potassium base results in precipitation of dipotassium phosphate and provides a slurry 33 of dipotassium phosphate crystals in a di-potassium phosphate solution. The slurry 33 is cooled by the cooling arrangement 50 by heat exchange to a temperature preferably below 90° C. Di-potassium phosphate crystals 44 are separated from the mother liquid 45 in a DKP precipitate remover 43. A first part 46 of the separated di-potassium phosphate solution is recycled to the DKP conversion reactor 32. A second part 51 of the separated di-potassium phosphate solution 45 is recycled to the mixing reactor 30 to form precipitated intermediate mono-potassium phosphate. In such a manner, potassium base addition and heat exchange during conversion of mono-potassium phosphate into di-potassium phosphate is utilized for the production of the intermediate mono-potassium phosphate.

The embodiments of FIG. 2 and FIG. 3 can also be combined in such a way that only a part of the MKP crystals separated in the precipitate remover 40 is brought into the DKP conversion reactor 32. The remaining part remains as MKP. In such a way, it is possible to produce well-defined mono-potassium phosphate and well-defined di-potassium phosphate in the same plant.

Figure 4:
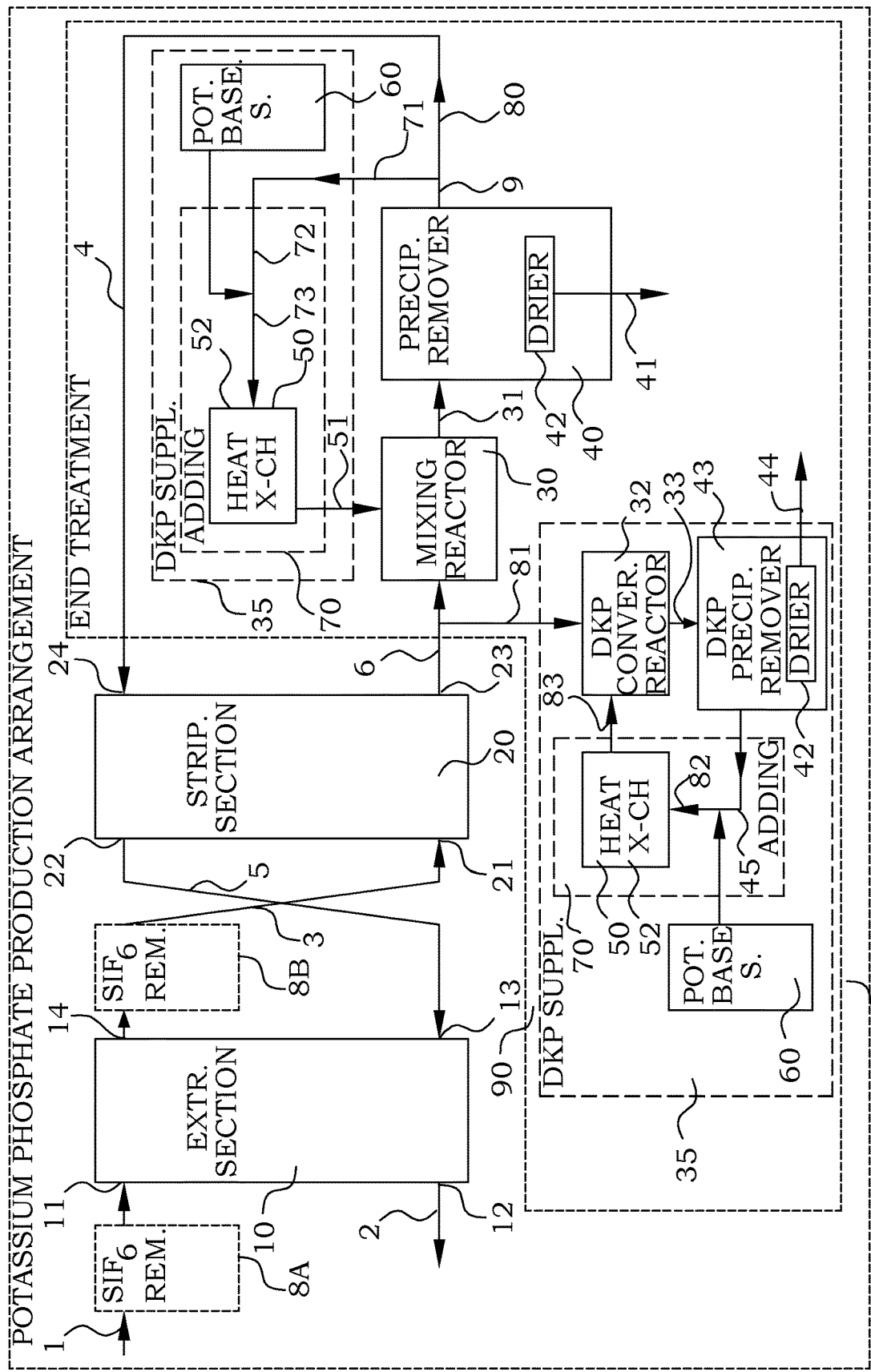
FIG. 4 is a block scheme of an embodiment of an arrangement for production of both mono-potassium phosphate and di-potassium phosphate.

Another embodiment for simultaneous production of well-defined mono-potassium phosphate and well-defined di-potassium phosphate is illustrated in FIG. 4. Here a partial stream 81 of the strip solution 6 loaded with monopotassium phosphate and phosphoric acid is entered into a DKP conversion reactor 32. A solution or slurry of tripotassium phosphate 83 is added. With appropriate mixing ratios and with an appropriate temperature, a di-potassium phosphate slurry 33 will be formed. The cooling arrangement is preferably configured for maintaining a temperature of the loaded strip solution below a saturation temperature for dipotassium phosphate, whereby crystals of dipotassium phosphate are precipitated. The slurry 33 comprises precipitated di-potassium phosphate crystals as well as a saturated di-potassium phosphate solution. The di-potassium phosphate crystals 44 are removed in the DKP precipitation remover 43, leaving a saturated di-potassium phosphate solution 45. The saturated di-potassium phosphate solution 45 is led to a second adding arrangement 70, in which potassium from a second potassium base source 60 (or from the potassium source used for the mono-potassium phosphate production) is added. A slurry of tri-potassium phosphate 82 is formed, which is cooled down in a heat exchanger 52, to provide the slurry of tri-potassium phosphate 83 to be used in the DKP conversion reactor 32.

Figure 5:
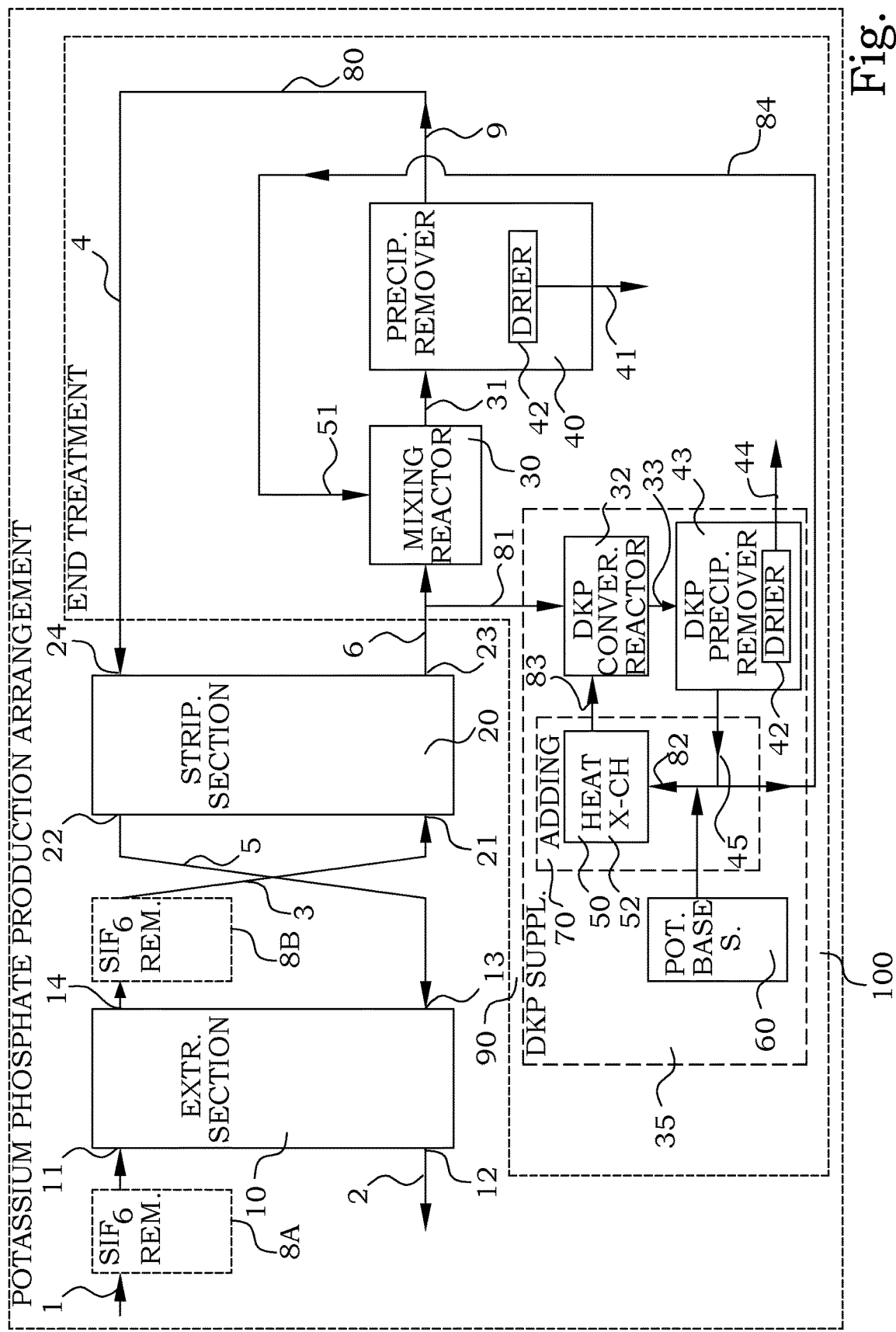
FIG. 5 is a block scheme of another embodiment of an arrangement for production of both mono-potassium phosphate and di-potassium phosphate.

A drawback with this embodiment is that the di-potassium phosphate production part successively will collect volumes of di-potassium phosphate solutions that are not re-circulated back to the stripping section. At the same time, the mono-potassium phosphate production part will lose the corresponding volumes, which have to be replaced. Another embodiment, at least partly solving that problem is illustrated in FIG. 5. Here, the dipotassium phosphate supplying arrangement connected to the stream of mono-potassium phosphate is omitted. Instead, the dipotassium phosphate supplying arrangement 35 of the di-potassium phosphate production is used for the supply of dipotassium phosphate 51 to the mixing reactor 30. To this end, a partial stream 84 of the potassium phosphate solution 45, in this embodiment a solution of dipotassium phosphate, leaving a precipitation remover, in this embodiment the DKP precipitation remover 43, is re-circulated to be used in the production of mono-potassium phosphate.

In other words, the dipotassium phosphate production portion is configured for adding potassium base to a stream comprising monopotassium phosphate. This causes crystals of dipotassium phosphate to precipitate from a saturated dipotassium phosphate solution. The dipotassium phosphate supplying arrangement comprises a dipotassium phosphate reconnection, connecting a part stream of the saturated dipotassium phosphate solution from the dipotassium phosphate production portion as the supplied dipotassium phosphate to the production of monopotassium phosphate.

In a further embodiment, the embodiments of FIGS. 4 and 5 can be combined, such that the mixing reactor 30 can have a supply of dipotassium phosphate solution from either of the dipotassium phosphate supplying arrangements 35. The amount of dipotassium phosphate solution from the different parts can then be controlled to suit a requested ratio of produced monopotassium phosphate crystals and dipotassium phosphate crystals.

Figure 6:
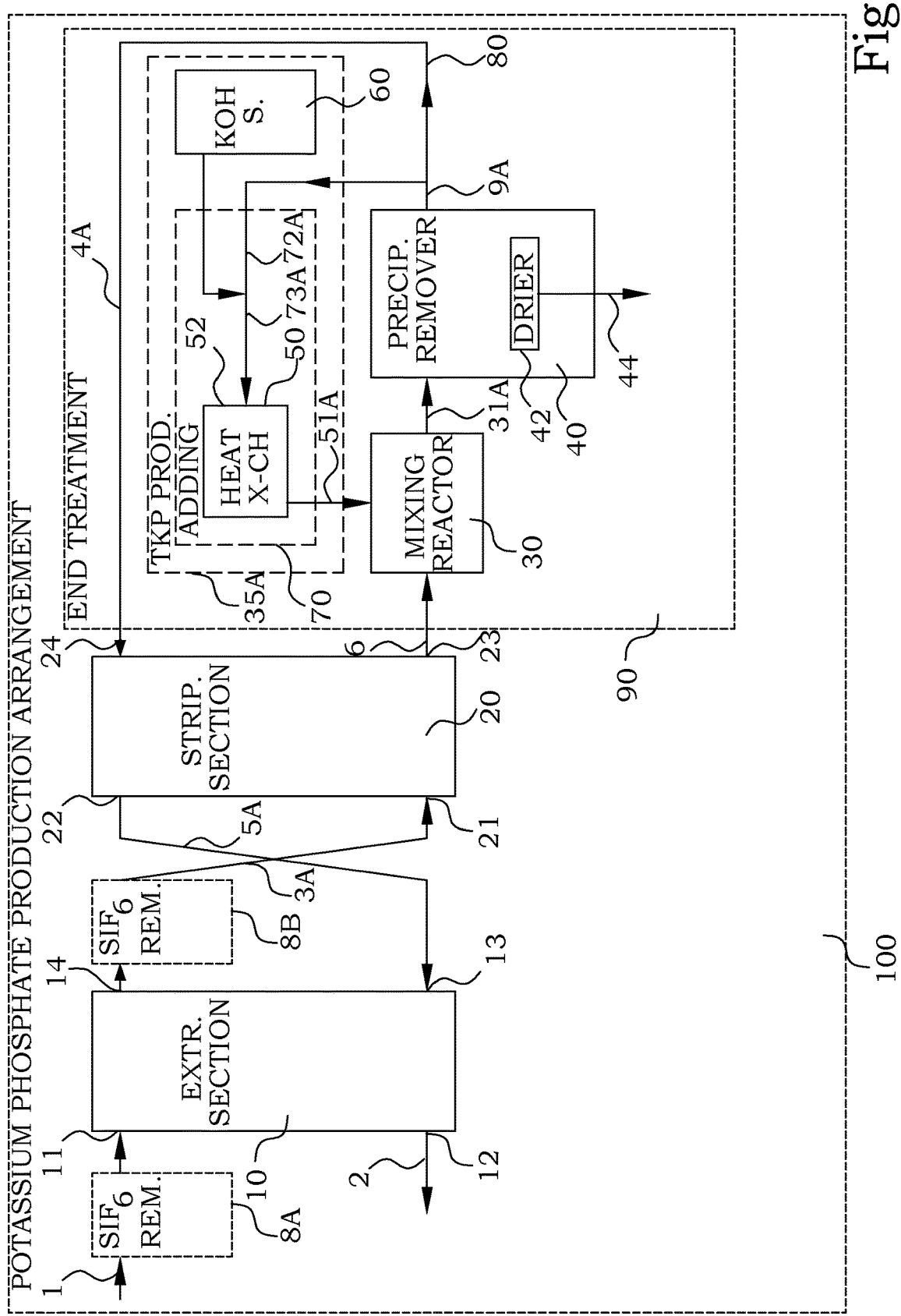
FIG. 6 is a block scheme of an embodiment of another arrangement for production of di-potassium phosphate.

An additional embodiment of an arrangement for production of di-potassium phosphate according to the present invention is hereby described with reference to FIG. 6. Most parts are similar as in FIG. 2 and the differences consist mainly of the type of solutions used in the different parts of the arrangement. The phosphoric acid containing feed solution 1 is fed to a liquid-liquid extraction section 10. The temperature of the water-immiscible solvent 5A is preferably below 60° C. since lower temperatures favor phosphoric acid extraction.

The liquid-liquid extraction section 10 is preferably configured for executing a continuous liquid-liquid extraction process using preferably liquid-liquid extraction equipment such as pulsed-columns. However, any other liquid-liquid extraction equipment can be used such as, agitated columns, non-agitated columns, mixer settlers, inline mixers, centrifugal contactors, etc. The raffinate 2, which is depleted in phosphate, is led to further treatment such as reuse for dissolution, etc. The water-immiscible solvent 3A which is loaded with phosphoric acid is optionally scrubbed with an aqueous solution to remove co-extracted impurities.

The phosphorus-loaded water immiscible liquid phase 3A is thereafter mixed with a recycled di-potassium phosphate solution as strip solution 4A in the stripping section 20. As before, the stripping section 20 is preferably configured for a continuous liquid-liquid extraction process using preferably liquid-liquid extraction equipment such as a mixer settler. However, any other liquid-liquid extraction equipment can be used such as, pulsed-columns, agitated columns, non-agitated columns, inline mixers, centrifugal contactors, etc.

In contrast to stripping with a solution of mono-potassium phosphate, which was found to be based on extraction equilibrium, stripping with a solution of di-potassium phosphate is being based on conversion of phosphoric acid into a dissolved salt.

The reaction is believed to be the following:

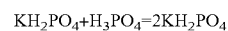

Since stripping with a di-potassium phosphate solution is not based on extraction equilibrium, complete stripping can be obtained in a single contact stage. Therefore, when using a di-potassium phosphate solution for stripping, the preferred liquid-liquid extraction equipment is a single mixer settler unit.

Stripping of phosphoric acid from the loaded water-immiscible solvent according to the present embodiment is done with recycled di-potassium phosphate solution 4A preferably in such a way that the solubility of mono-potassium phosphate or di-potassium phosphate is not exceeded. This enables to operate with only two phases during stripping in a mixer settler.

According to the present embodiment, stripping of phosphoric acid from the loaded water-immiscible solvent 3A is done with a solution of di-potassium phosphate 4A by which precipitation of mono-potassium phosphate or di-potassium phosphate does not occur. It was found that, by controlling the phase ratio of the solvent 3A to di-potassium phosphate solution 4A during stripping to a certain level, precipitation of mono-potassium phosphate can be completely omitted. The phase ratio of solvent 3A to di-potassium phosphate solution 4A in which precipitation of mono-potassium phosphate does not occur depends on the phosphoric acid loading in the water-immiscible solvent 3A and the concentration of di-potassium phosphate solution 4A. This means that the phase ratio preferably has to be adapted for each operational condition.

The potassium phosphate solution, i.e. the input strip solution 4A, is in a test setup of this embodiment composed of recycled di-potassium phosphate solution.

Similar to stripping with a solution of mono-potassium phosphate, stripping with a solution of di-potassium phosphate can be used for increasing the concentration of phosphate in the strip solution 6 compared to the original concentration in the water-immiscible solvent 3A. This is done by having an organic to aqueous phase ratio larger than 1 during the stripping process. Generally, a higher concentration of di-potassium phosphate 4A will enable a higher organic to aqueous phase ratio during stripping. A higher di-potassium phosphate concentration can be obtained by operating at a higher temperature. The organic to aqueous phase ratio must preferably not be increased to levels in which precipitation of mono-potassium phosphate occurs during the stripping process.

The phase ratio is calculated for specific operational conditions and temperature according to the solubility of the ionic species involved.

Returning to FIG. 6, the strip solution 6 is composed of a mixture of $KH_2PO_4$ and $K_2HPO_4$. The ratio of $K_2HPO_4$ to $KH_2PO_4$ in the obtained strip solution 6 is therefore important since sufficient amount of $K_2HPO_4$ is preferably required in order not to form precipitates of mono-potassium phosphate during the stripping process in the stripping section 20. The strip solution 6 is mixed with a potassium phosphate solution or slurry comprising $K_3PO_4$ 51A. The slurry 31A exiting the mixing reactor 30 is composed of $K_2HPO_4$ crystals in a saturated $K_2HPO_4$ solution. The slurry 31A exiting the mixing reactor 30 is fed to the precipitate remover 40. In this embodiment, the precipitate remover 40 is configured for separating the precipitated di-potassium phosphate crystals 44 from the di-potassium phosphate solution 9A. Separation can be done by any solid-liquid separation technique such as filtration, settling, centrifugation, etc.

The separated crystals can be dried and/or granulated according to known processes forming a final di-potassium phosphate product. The separated crystals can also be mixed with other ingredients such as nitrogen forming different fertilizer products.

The aqueous di-potassium phosphate solution 9A exiting the precipitate remover 40 is split into two parts 4A and 72A. One part of the aqueous di-potassium phosphate solution 4A is recycled back to the stripping section 20. A second part 72A of the aqueous di-potassium phosphate solution is treated for addition of a potassium base. Addition of a potassium base to the aqueous di-potassium phosphate solution 72A results in heat generation and may form a slurry 73A. The heat of neutralization is removed by the heat exchanger 52. The solution/slurry 73A is composed of a mixture of $K_2HPO_4$ and $K_3PO_4$. Addition of potassium base should be proportional to the phosphate loading in the water immiscible solvent 3A. The cooled off slurry 51A is provided to the mixing reactor 30 as described further above.

In another embodiment, the input strip solution is a mixture of $KH_2PO_4$ and $K_2HPO_4$. The input strip solution has a ratio of K/P and a concentration of phosphate ions prohibiting crystals of monopotassium phosphate or dipotassium phosphate to precipitate when brought in contact with the solvent loaded with phosphate in the stripping section.

If the input strip solution has a ratio of K/P and a concentration of phosphate ions causing crystals of monopotassium phosphate to precipitate when brought in contact with the solvent loaded with phosphate in the stripping section, the stripping section has to be designed as a three phase stripping section. The precipitate remover is then configured for separating the crystals of monopotassium phosphate from the loaded strip solution exiting the stripping section.

When the input strip solution is a mixture of $KH_2PO_4$ and $K_2HPO_4$, the arrangement preferably comprises a mixing control unit, configured to control the composition of the input strip solution 4.

Figure 7:
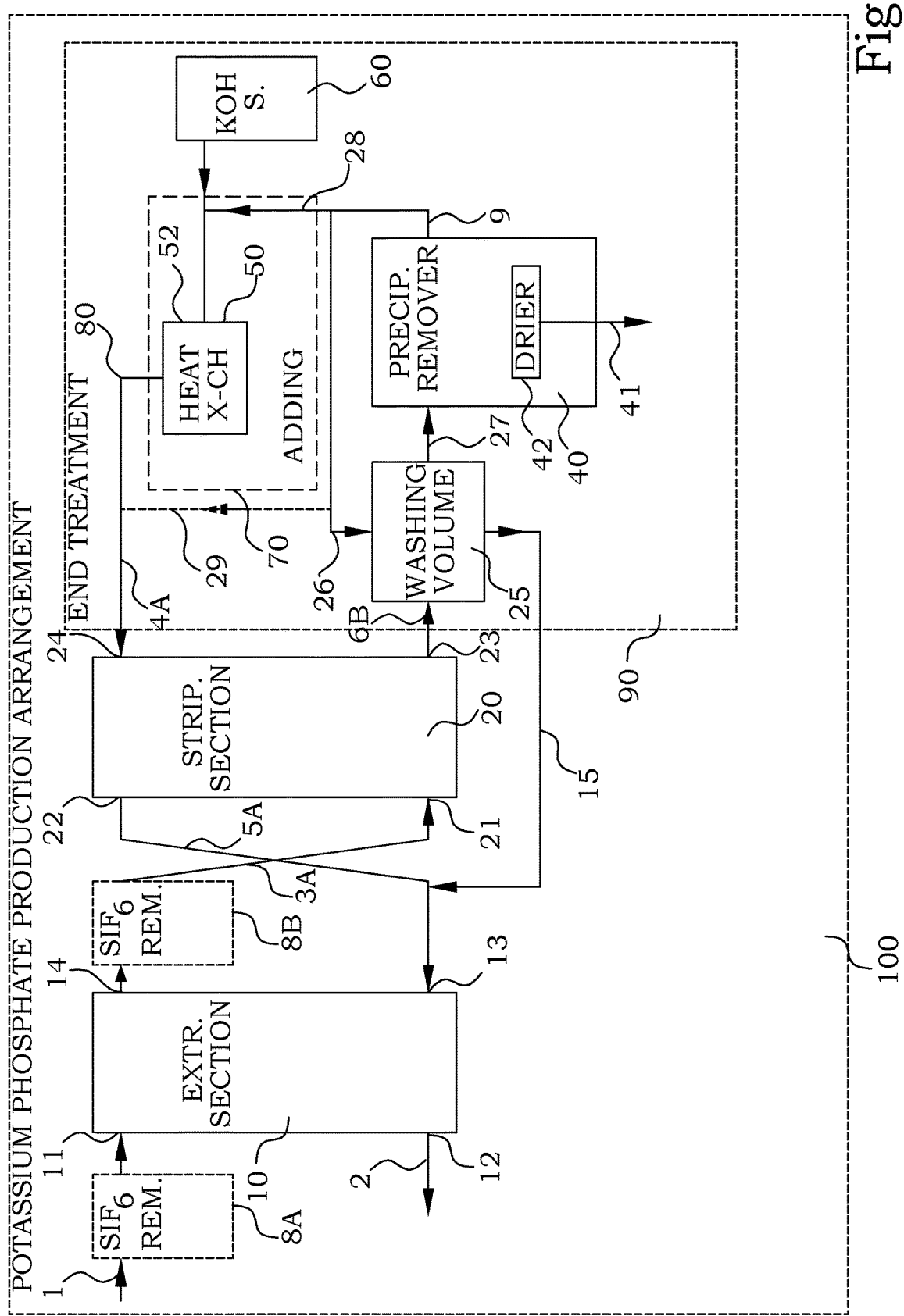
FIG. 7 is a block scheme of an embodiment of another arrangement for production of mono-potassium phosphate.

Another embodiment which enables production of mono-potassium phosphate is illustrated in FIG. 7. In this embodiment the strip solution 4A is composed of $K_2HPO_4$. The loaded water-immiscible solvent 3A is stripped with the strip solution 4A and results in formation of three phases; stripped solvent 5A, loaded strip solution and precipitated $KH_2PO_4$ crystals. The stripped solvent 5A is separated and is reused for extraction of phosphoric acid. The aqueous phase leaving the stripping section, i.e. the strip solution 6B is now composed of the $KH_2PO_4$ crystals in saturated $KH_2PO_4$ solution. A small problem with this embodiment is that the so formed $KH_2PO_4$ crystals contain too high levels of residual solvent. In order to remove such residual solvent, the strip solution 6B is mixed with recycled mono-potassium phosphate solution 26 in a washing volume 25. This washing enables separation of residual solvent at a higher aqueous to organic phase ratio and the residual solvent 15 can be re-cycled into the extraction section 10. The slurry of $KH_2PO_4$ crystals in saturated $KH_2PO_4$ solution 27 after separation of residual solvent 15 is fed to the precipitate remover 40. In the precipitate remover 40 mono-potassium phosphate crystals 41 are separated from the mother liquid.

A first part 28 of the separated mono-potassium phosphate solution 9 is provided to the adding arrangement 70 for being treated for addition of a potassium base from the source of potassium base 60. A solution composed of $K_2HPO_4$ 4A is formed. Also this neutralization reaction generates heat, which is cooled off by the heat exchanger 52 of the cooling arrangement 50. After cooling in heat exchanger 52, the di-potassium phosphate solution 4A is reused for stripping.

A second part 26 of the separated mono-potassium phosphate solution 9 is reused for separation of residual solvent, as was described here above.

The three phase stripping section is also applicable in systems where a mixture of $KH_2PO_4$ and $K_2HPO_4$ is used as input strip solution, and where the ratio of K/P and the concentration of phosphate ions causing crystals of monopotassium phosphate to precipitate when brought in contact with the solvent loaded with phosphate in the stripping section.

Minor changes may then be made to the arrangement. These are indicated with dotted lines in FIG. 7. To this end, a third part 29 of the separated mono-potassium phosphate solution 9 is allowed to short-cut the adding arrangement, which means that after cooling in heat exchanger 52, the di-potassium phosphate solution is mixed with the third part 29 of the separated mono-potassium phosphate solution, forming a solution 4A composed of a mixture of $KH_2PO_4$ and $K_2HPO_4$. Preferably, the adding arrangement comprises an adding control configured to add a stream of the strip solution direct from the outlet of the precipitate remover 40 with a stream of the solution comprising dipotassium phosphate from the heat exchanger 52 to obtain the required K/P ratio at the stripping section 20.

Figure 8:
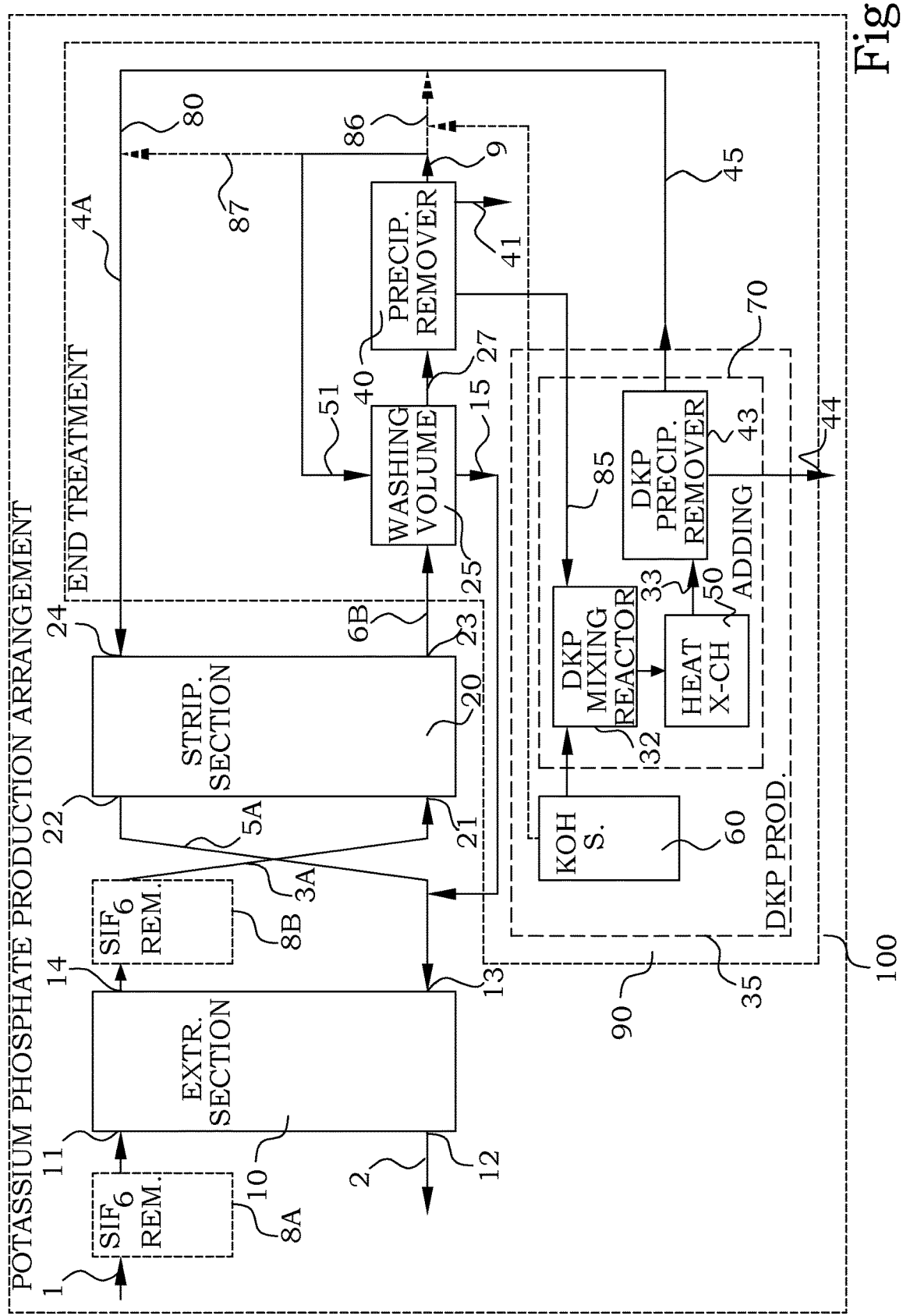
FIG. 8 is a block scheme of yet another embodiment of an arrangement for production of both mono-potassium phosphate and di-potassium phosphate.

The use of a three phase stripping section 20 can also be combined with production of either or both of MKP and DKP. One embodiment is illustrated in FIG. 8. A slurry 85 of monopotassium phosphate crystals in a saturated monopotassium solution is taken from the precipitate remover 40 and entered into a DKP mixing reactor 32. A potassium base is added and the neutralization heat is cooled off, in analogy with the embodiment of FIG. 3. However, in the embodiment of FIG. 8, the dipotassium phosphate solution 45 from the DKP precipitate remover 43 is here instead returned to be used as strip solution. If the amount of dipotassium phosphate crystals is too low to maintain the input strip solution, a stream of monopotassium phosphate 86 can be taken from the precipitate remover 40, and potassium base can be added for turning the solution into a dipotassium phosphate solution. Optionally, a cooling arrangement could be connected also to such a stream.

If the strip solution is composed of a mixture of $KH_2PO_4$ and $K_2HPO_4$, a part 87 of the monopotassium phosphate solution from the precipitate remover 40 can be mixed into the input strip solution without passing the adding arrangement 70. Also here, an adding control can be provided and configured to add a stream of the strip solution direct from the outlet of the precipitate remover 40 with a stream of the solution comprising dipotassium phosphate to obtain the required K/P ratio at the stripping section 20.

It has also been discovered by the present applicant that mono potassium phosphate can be formed directly in the loaded solvent by addition of a potassium base and mixing it with the loaded solvent as is presented in the examples further in the text.

However, in that case relatively large amounts of solvent remain adhering to the separated potassium phosphate crystals. These amounts are typically large enough that a loss of expensive solvent mixture generally would be economically unacceptable. It is therefore preferable to also recycle these amounts of solvent.

Figure 9:
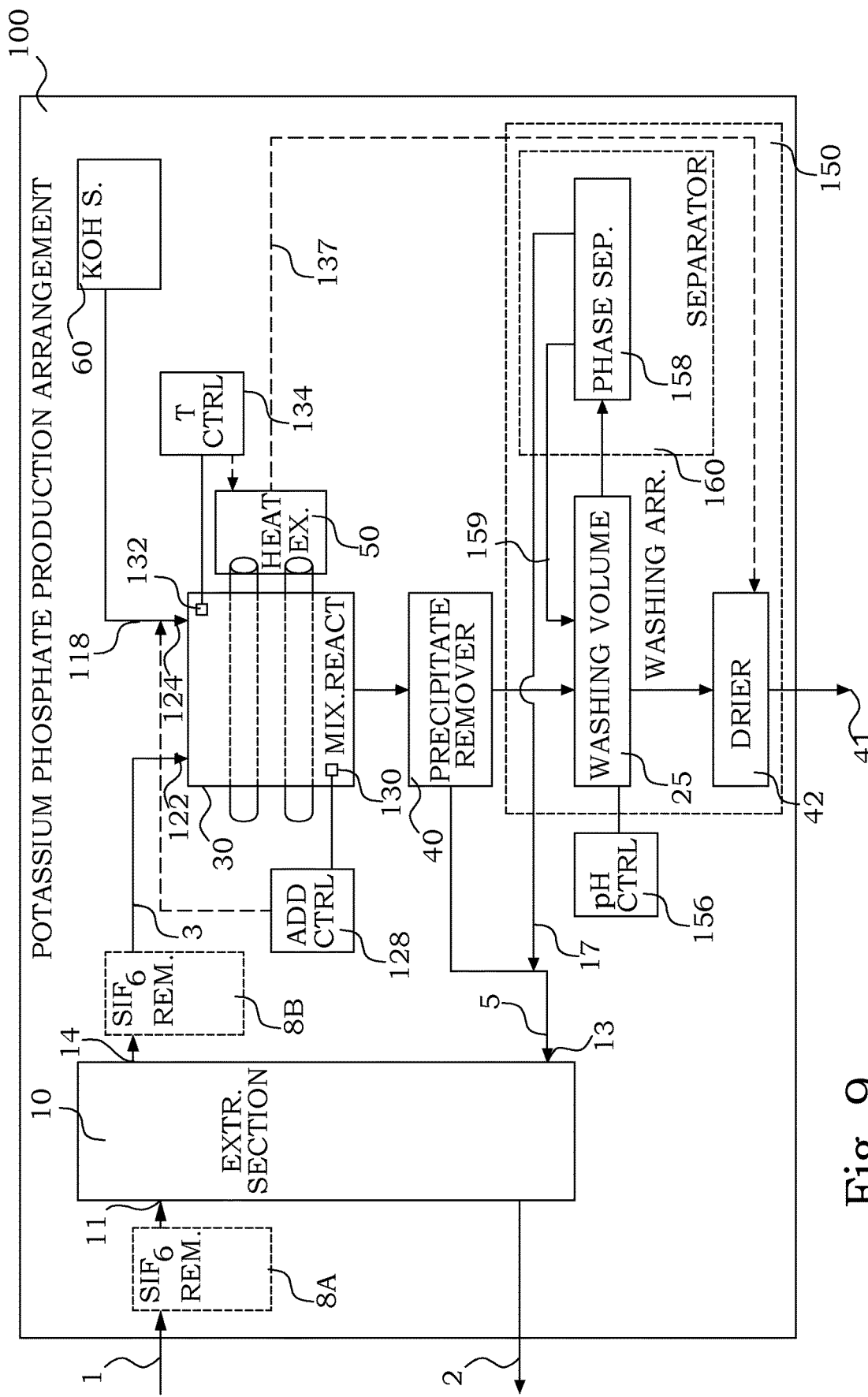
FIG. 9 is a block scheme of an example of an arrangement for production of mono-potassium phosphate.

In FIG. 9, the solvent 3 loaded with phosphate is provided to a first inlet 122 to a mixing reactor 30. Potassium hydroxide 118, from a source of potassium hydroxide 60, is provided to a second inlet 124 of the mixing reactor 30. Monopotassium phosphate is formed within the mixing reactor 30. An addition control 128 senses by e.g. a pH meter or other sensor 130 the composition within the mixing reactor 30 and controls the amount of potassium entered through the second inlet 124 to exceed the solubility level of monopotassium phosphate. During the mixing, heat is generated, which is assimilated by a heat exchanger 50. A temperature sensor 132 senses the mixing reactor temperatures and a temperature control 134 controls the operation of the heat exchanger 50 to maintain a reasonable temperature. The mixed solution including the precipitated monopotassium crystals are provided to a precipitate remover 40, separating potassium phosphate crystals from the solution 5, which is brought back to the extraction section 10 for further extractions.

In the embodiment of FIG. 9, the arrangement 100 for production of potassium phosphates comprises washing arrangement 150, in turn comprising a washing volume 25 connected to the precipitate remover 40. The washing volume 25 is arranged for washing the separated potassium phosphate crystals. A drier 42 is connected to the washing volume 25 and is arranged for drying the washed crystals 41. A separator 160 is connected to the washing volume 25 and is arranged for separating residual solvent 17 washed from the crystals. The separator 160 is thereby connected to the inlet to the extraction section 10 for solvent depleted from phosphorous for reusing the separated residual solvent 17 for further adsorbing of phosphorous in the extraction section 10. The separator is also arranged for providing washing liquid depleted from residual scavenger 159 for reuse for washing crystals in the washing volume 25.

According to one embodiment of the present invention, the solvent adhering to the separated potassium phosphate crystals is removed by washing the potassium phosphate crystals with a saturated aqueous potassium phosphate solution. The solvent initially adhering to the crystals forms a separate phase which typically is lighter than the dense aqueous phase and is as mentioned further above water immiscible. The two phases are thereby spontaneously separated from each other. The separator 160 of the present embodiment therefore is a phase separator 158 arranged for separation of the solvent and said saturated aqueous solution of potassium phosphate. It was surprisingly found that the above-mentioned wash procedure is highly efficient. It is believed that the washing with saturated potassium phosphate solution is a dynamic process in which potassium phosphate crystals constantly dissolve and re-crystallize enabling efficient removal of adhering solvent. The operation of the wash procedure is simple and is not energy intensive. The saturated potassium phosphate solution which is separated from the crystals is continuously recycled for further washing. Make up of saturated potassium phosphate solution is made by dissolving produced potassium phosphate salts in aqueous solutions such as water, phosphoric acid, or other acid/salt solutions. As mentioned also before, the separated water-immiscible solvent is continuously recycled in order to extract phosphate from a feed solution.

The washed potassium phosphate crystals are thereafter dried in the drier 42. The drying can preferably at least to a part be performed by heat obtained from the heat exchange process cooling the mixing of potassium base with phosphoric acid. To that end the drier 42 is connected to the heat exchanger 50 as indicated by the broken arrow 137. The drier 42 is thereby arranged for utilizing at least a part of the heat extracted in the heat exchanger 50 for drying the washed crystals 41.

The produced potassium phosphates are fully water-soluble, metal depleted and can be used for agricultural purposes such as fertilization or fertigation.

Another important advantage of the wash process according to a preferred embodiment of the present invention is that it enables to control the production of potassium phosphates to produce either MKP or DKP independent of the initial composition of the precipitated crystals. If MKP is the desired end product, then the wash solution used is preferably composed of saturated aqueous solution of mono-potassium phosphate. The pH of the slurry is controlled and adjusted to optimal value by addition of e.g. phosphoric acid or potassium base. A pH control 156 can therefore be provided to control the pH in the washing volume 25. This procedure results in production of MKP independent of the initial composition of the precipitated crystals. In a similar way if DKP is the desired end product then the wash solution used is composed of saturated aqueous solution of di-potassium phosphate. The pH of the slurry is controlled and adjusted to optimal value for DKP by addition of e.g. potassium base. This procedure results in production of DKP independent of the initial composition of the precipitated crystals. In such a manner, production of both MKP and DKP is possible according to the invention. To this end, the washer 25 is thus arranged for controlling a pH of the saturated aqueous solution of mono-potassium phosphate and/or di-potassium phosphate.

Figure 10:
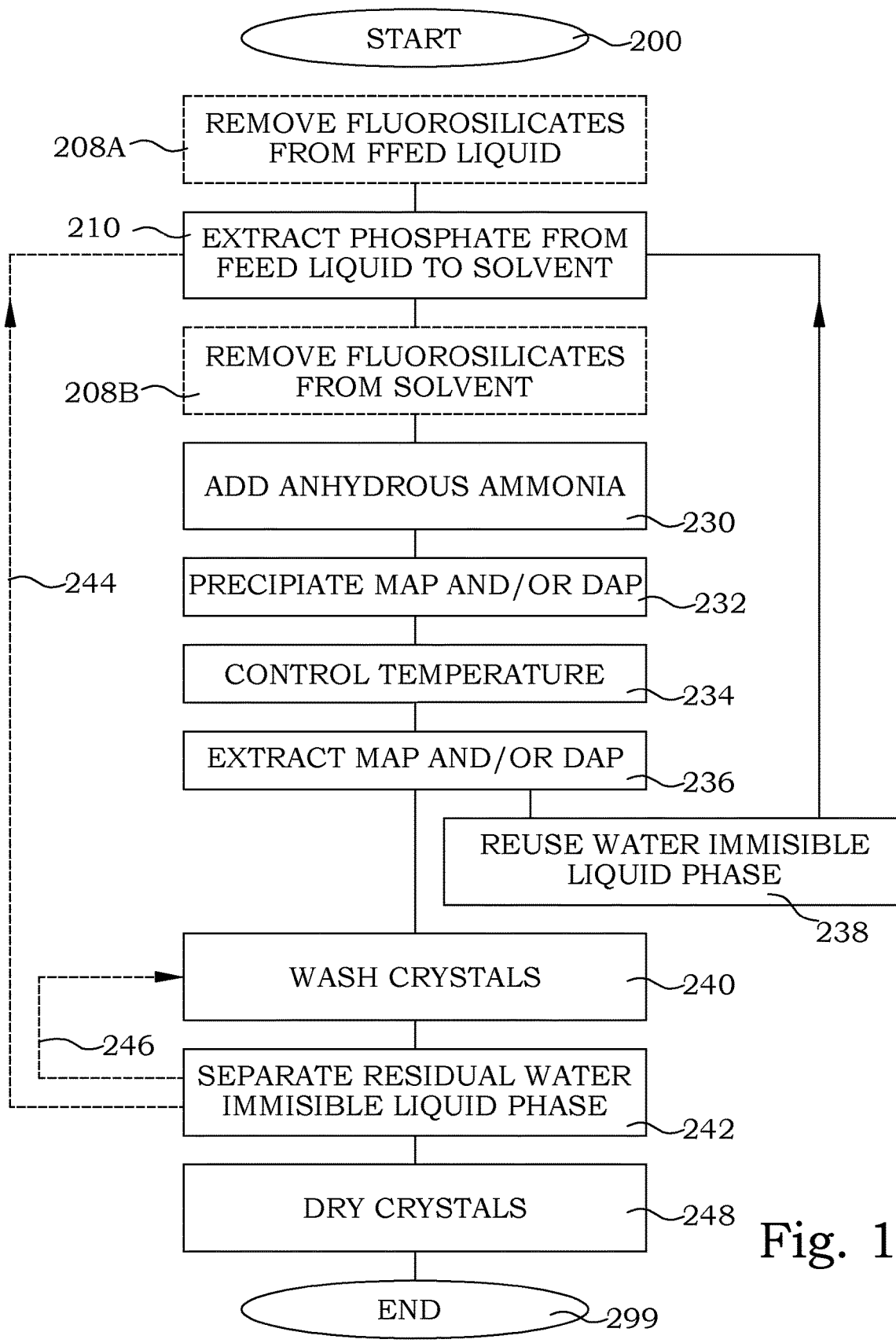
FIG. 10 is a flow diagram of steps of an example of a method for production of potassium phosphates.

FIG. 10 illustrates a flow diagram of steps of a method according to an embodiment of the present invention. A method for production of potassium phosphates begins in step 200. Step 210 is performed as described earlier. Steps 208A and 208B are, if necessary, performed as described earlier. Step 210 provides a phosphorus-loaded water immiscible liquid phase. Potassium base is added to the water immiscible liquid phase in step 230. In one particular embodiment, the step 230 of adding comprises monitoring of a conductivity of the water immiscible liquid phase and controlling an amount of added potassium base in response to the monitored conductivity. In another particular embodiment, the step 230 of adding comprises monitoring of a pH of the water immiscible liquid phase and controlling an amount of added potassium base in response to the monitored pH. Mono-potassium phosphate and/or di-potassium phosphate is in step 232 precipitated from the water immiscible liquid phase. In step 234, a temperature of the water immiscible liquid phase during the steps of adding and precipitating is controlled to be situated within a predetermined temperature interval. As will be discussed more in detail further below, the actual step of controlling can be performed before, during and/or after the steps of adding and precipitating. The important feature is that it is ensured that the temperature during the adding and precipitating is kept within predetermined limits. It is of less importance when the actual instant of heat removal occurs. Step 234 may therefore be situated in time before, concurrent with and/or after the steps 230 and 232. The temperature controlling typically comprises extraction of heat from the water immiscible liquid phase. In step 236 the precipitated mono-potassium phosphate and/or di-potassium phosphate is extracted from the water immiscible liquid phase. The water immiscible liquid phase is reused for further extractions in step 238.

In the embodiment illustrated in FIG. 10, the method further comprises a step 240, in which crystals of extracted precipitated mono-potassium phosphate and/or di-potassium phosphate is washed. In step 242, residual water immiscible liquid phase, i.e. typically solvent, washed from the crystals is separated. The separated residual scavenger is preferably reused for further adsorbing of phosphorous to obtain the phosphorus-loaded water immiscible liquid phase as indicated by the broken arrow 244. Similarly, washing liquid depleted from residual solvent is reused for further washing of the crystals as indicated by the broken arrow 246. In this particular embodiment, the washing is performed with saturated aqueous solution of potassium phosphate and the separating of residual solvent is performed by phase separation of the solvent and the saturated aqueous solution of potassium phosphate. The washed crystals are dried in step 248. Preferably, the drying utilizes at least a part of the heat extracted from the step of controlling the temperature.

There are alternative approaches for the crystal washing. The adhering solvent can be removed from the crystals by washing with an organic solvent having a boiling point which is considerably lower than the boiling point of the extracting solvent and in which crystalline potassium phosphates are insoluble. The organic solvent used for washing can be fully-miscible with water. Examples of possible solvents for washing potassium phosphate crystals include acetone (boiling point of 56.5° C.), methanol (boiling point of 64.7° C.), etc. The recovered crystalline potassium phosphates can be treated to remove remains of wash solvent by distillation. The obtained wash solution can be collected and the organic solvent, used for washing, can be separated from the solvent by distillation.

Figure 11:
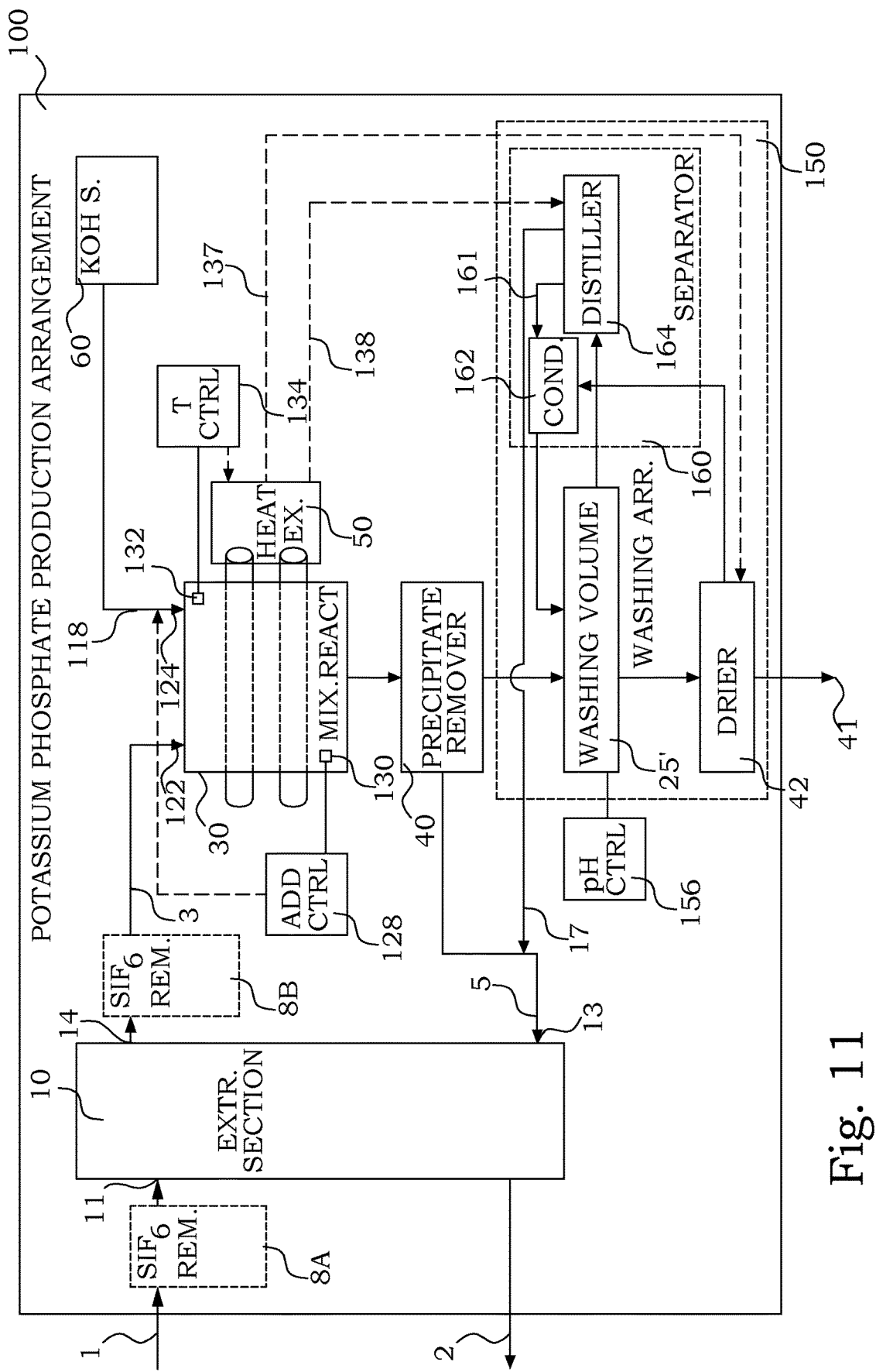
FIG. 11 is a block scheme of another example of an arrangement for production of mono-potassium phosphate.

Such an embodiment is illustrated in FIG. 11. The washing volume 25' is here arranged for washing the crystals with an organic washing solvent in which potassium phosphates are insoluble. The separator 160 comprises a distiller 164 separating the washing solvent 161 in gas phase from the residual extracting solvent 17 still appearing as a liquid. The heat extracted from the mixing reactor 30 may preferably also be used as at least a part of the required heat source for the distilling operation, as indicated by the arrow 138. The gaseous washing solvent 161 is condensed in a condenser 162. From the drier 42, gaseous washing solvent is also produced, which preferably also is connected back to the condenser 162 for further reutilisation. However, as a minor drawback, it was found that the washing of the crystals with an organic solvent requires careful considerations regarding flow and amount of washing solvent. The volume of wash solvent required for washing may be relatively large. Furthermore, the process is somewhat more complex than the previous presented one, requiring more energy for separating the organic wash solvent from the organic extracting solvent by the distillation. Presently, the embodiment of using saturated aqueous solution of mono-potassium phosphate and/or di-potassium phosphate is considered to be preferred.

As briefly mentioned above, the actual extraction of heat from said phosphorous-loaded water immiscible liquid phase can be performed in different ways. In the embodiments of FIG. 9 and FIG. 11, the heat exchanger 50 is integrated in the mixing volume 30. This is presently believed to be the preferred way, since it gives a well-controlled temperature.

Figure 12:
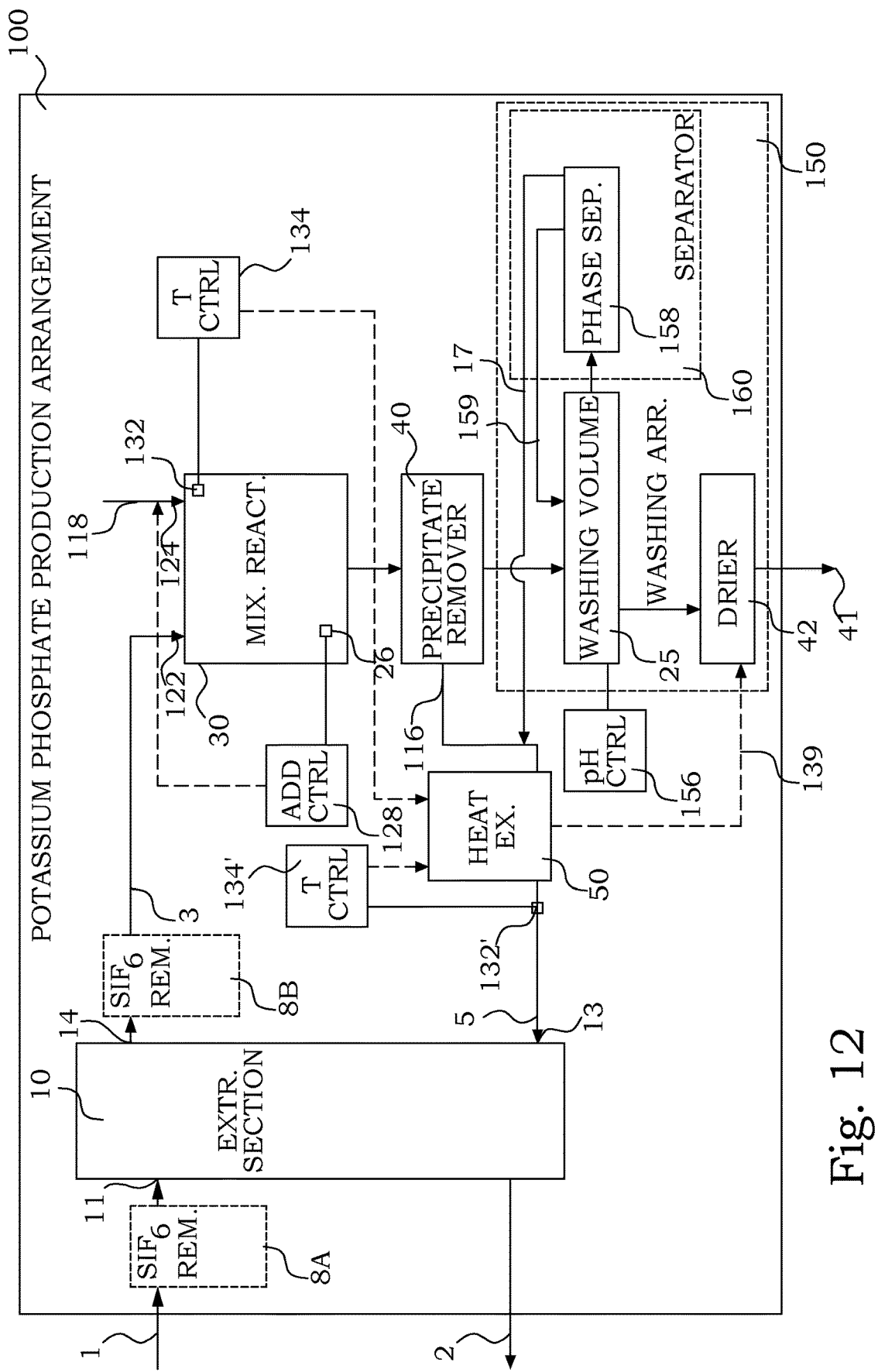
FIG. 12 is a block scheme of yet another example of an arrangement for production of mono-potassium phosphate.

However, alternatives are also possible. In FIG. 12, an embodiment is illustrated, where the heat exchanger 50 is arranged in contact with the water immiscible liquid phase 116 leaving the precipitate remover 40. The controller 134 may still be controlled based on the temperature in the mixing reactor 30 as measured by a thermometer 132. Alternatively, or in addition, a controller 134' can be operated based on the temperature of the solvent entering the extraction section 10 by means of a thermometer 132'. In this way, the temperature of the solvent entering the extraction section 10 is primarily controlled, which in turn will keep the temperature of the phosphorous-loaded water immiscible liquid phase within the mixing reactor 30 in the next cycle within the requested temperature interval, in particular if there is information about the assumed phosphorus content leaving the extraction section 10 with the phosphorous-loaded water immiscible liquid phase. In other word, by controlling the temperature of the solvent entering the extraction section 10 an indirect control of the temperature in the mixing reactor 30 will also be achieved.

This can be a good alternative in arrangements, where the initial phosphorous content is relatively stable or at least predictable. The solvent 5 entering the extraction section 10 may then be optimized in temperature regarding phosphorous affinity.

Figure 13:
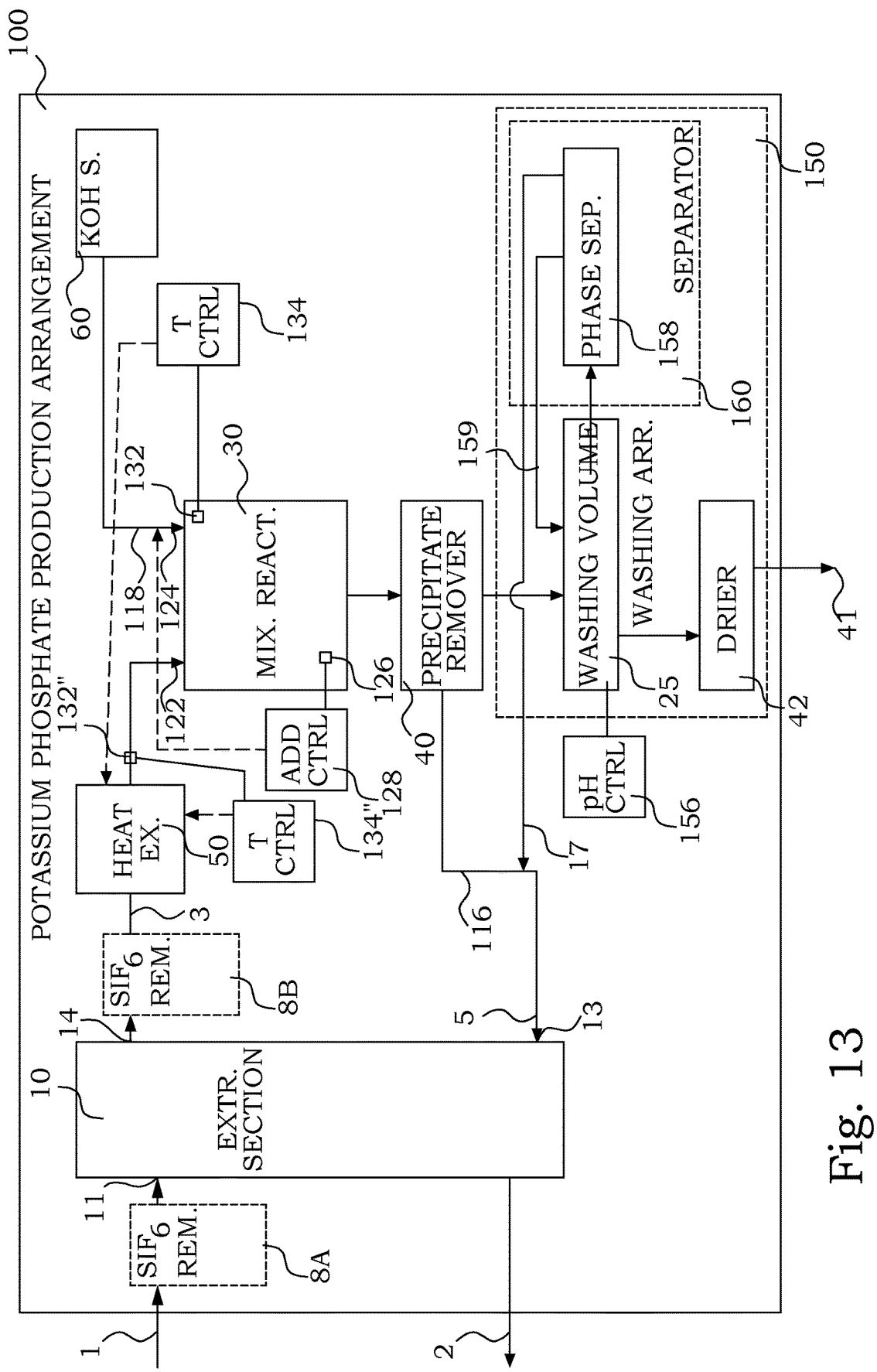
FIG. 13 is a block scheme of yet another example of an arrangement for production of mono-potassium phosphate.

In FIG. 13, yet another embodiment is illustrated, where the heat exchanger 50 is arranged in contact with the water immiscible liquid phase 3 leaving the extraction section 10 before entering the mixing reactor 30. Here, the control can be based on either or both of a temperature in the mixing reactor 30 or a temperature of the loaded solvent before entering the mixing reactor 30. The temperature in the solvent before entering the mixing volume is then measured by a thermometer 132" and using a controller 134". In this way, the temperature of the loaded solvent is reduced, and the expected exothermic reactions in the mixing reactor 30 will bring the water immiscible liquid phase to the predetermined temperature interval.

Tests have been performed on different systems in order to illustrate and verify the advantages obtained by methods and arrangements according to the principles described above. Some examples are presented here below.

EXAMPLE 1

Figure 14:
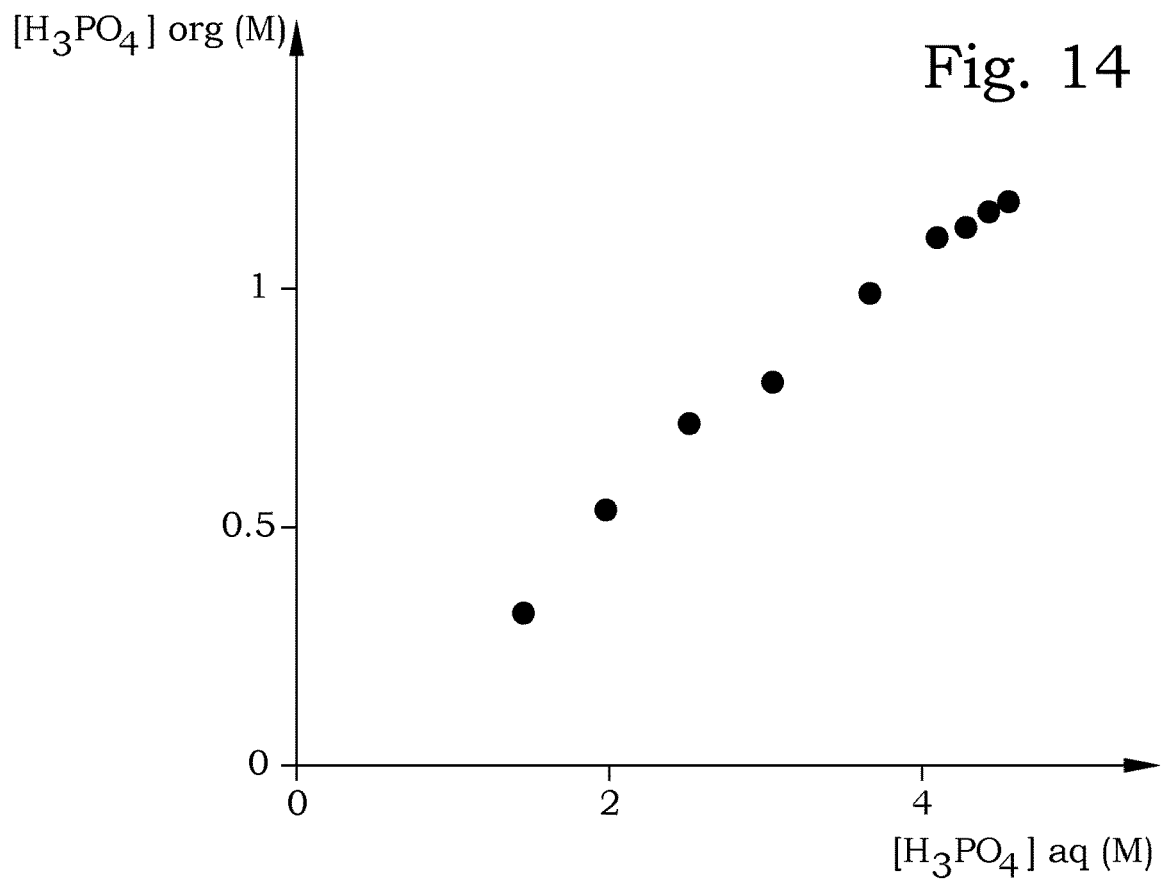
FIG. 14 is a diagram showing distribution data for $H_3PO_4$, using an aqueous phase with about 40% $H_3PO_4$ (4.85 M $H_3PO_4$), 7% $H_2SO_4$ (2.8 M) and 2% F (as $H_2SiF_6$) and an organic solvent: 80% vol. TBP and 20% vol. kerosene.
Figure 15:
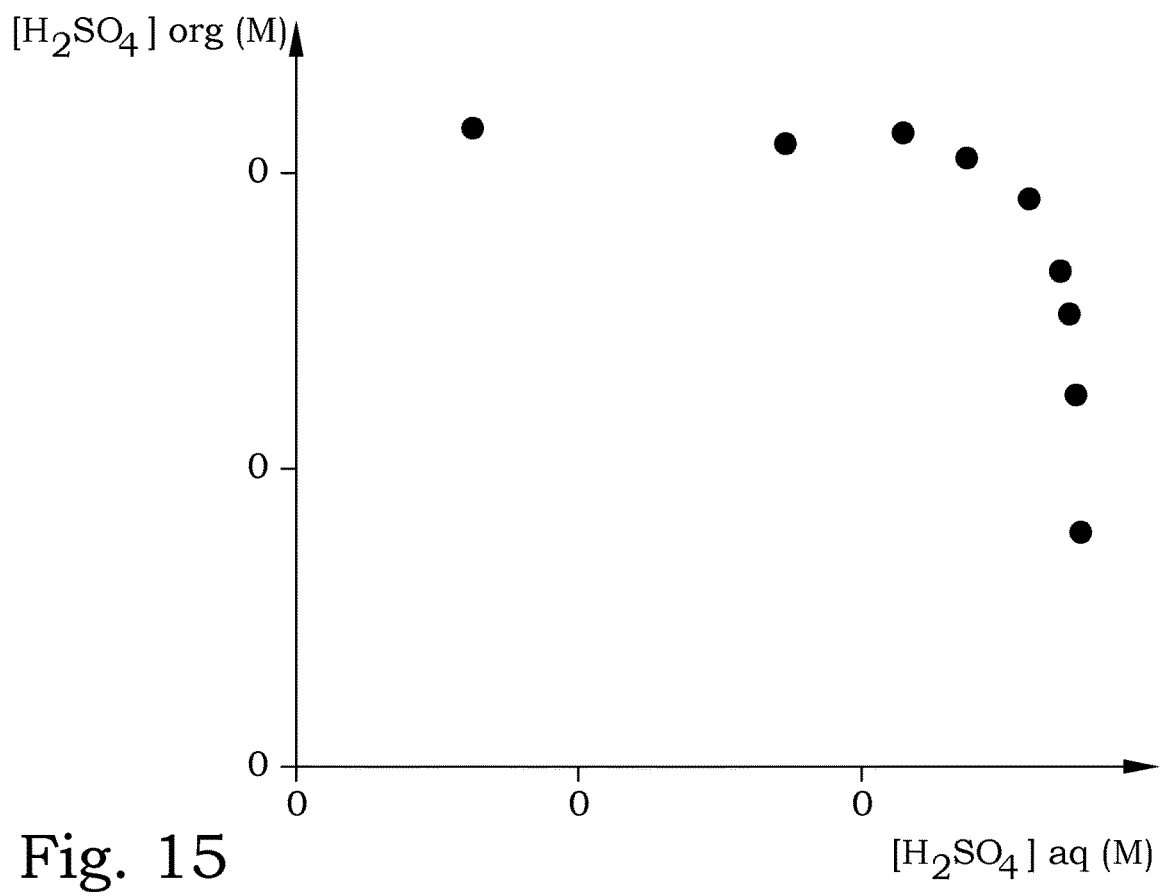
FIG. 15 is a diagram showing distribution data for $H_2SO_4$, using an aqueous phase with about 40% $H_3PO_4$ (4.85 M $H_3PO_4$), 7% $H_2SO_4$ (2.8 M) and 2% F (as $H_2SiF_6$) and an organic solvent: 80% vol. TBP and 20% vol. kerosene.

This example confirms the extraction of $H_3PO_4$, $H_2SO_4$ and $(SiF_6)^{2-}$ by solvents containing tributyl phosphate (TBP). Filter grade phosphoric acid with approx. 28% $P_2O_5$ (about 40% $H_3PO_4$ or 4.85 M $H_3PO_4$), 7% $H_2SO_4$ (2.8 M) and 2% F (as $H_2SiF_6$) was used as aqueous phase. An organic phase containing 80% vol. TBP and 20% vol. kerosene was contacted with the aforementioned aqueous phase at organic:aqueous (O:A) ratios ranging from 1:10 to 10:1. FIG. 14 shows the distribution data for $H_3PO_4$ (the concentration of $H_3PO_4$ in the aqueous phase vs. the organic phase at the O:A ratios tested) and FIG. 15 shows the distribution data for $H_2SO_4$. The trends show that as the organic phase loaded more $H_3PO_4$, $H_2SO_4$ was rejected. This can be exploited to minimize the co-extraction of $H_2SO_4$ by TBP, e.g., perform extraction of $H_3PO_4$ close the $H_3PO_4$ loading capacity of the organic solvent. Between 5-15% of the total F in the aqueous phase was extracted by the organic solvent at the different O:A ratios tested.

EXAMPLE 2

Figure 16:
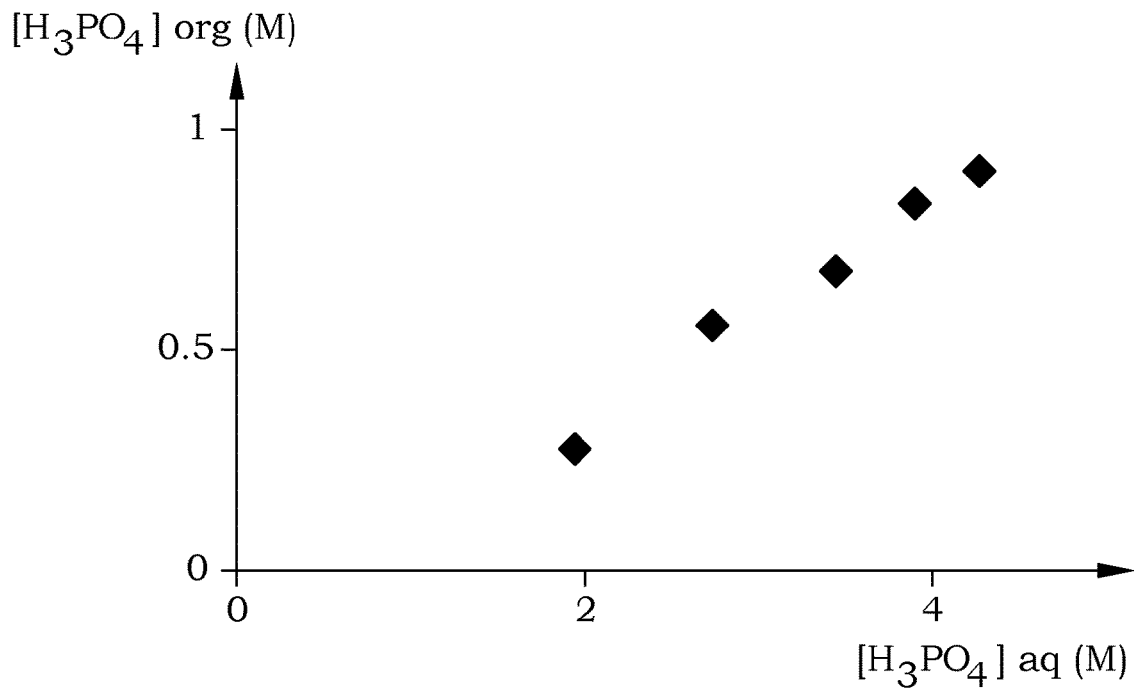
FIG. 16 is a diagram showing extraction of $H_3PO_4$ in a five-stage counter-current mixer settlers setup using 80% vol. TBP and 20% vol. kerosene at O:A 3:1.
Figure 17:
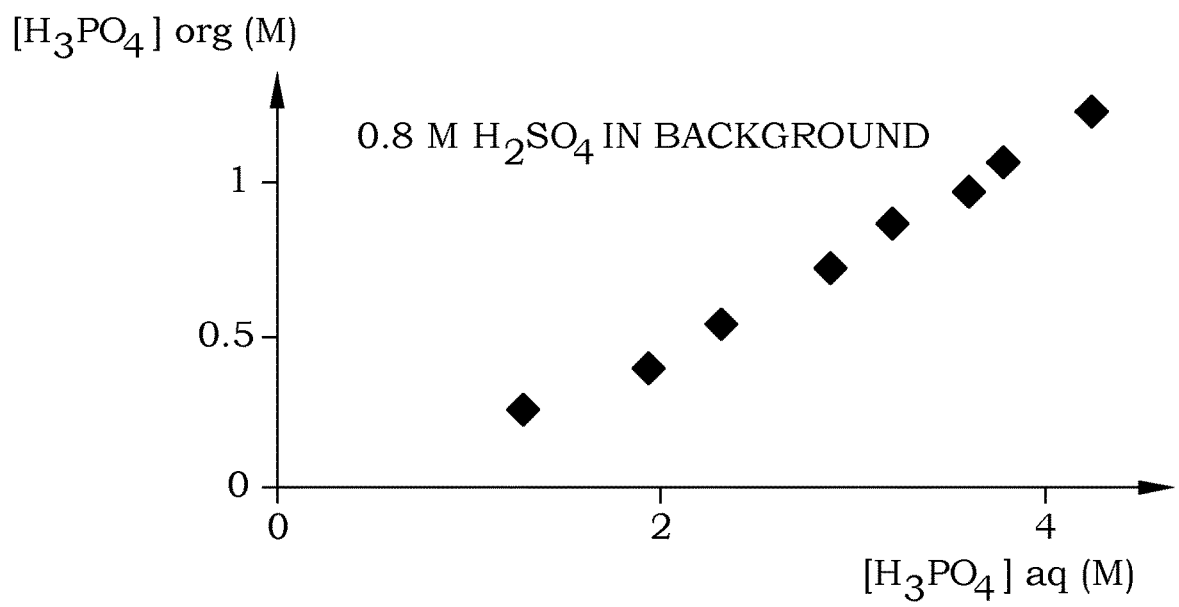
FIG. 17 is a diagram showing extraction of $H_3PO_4$ in an eight-stage counter-current mixer settlers setup using 80% vol. TBP and 20% vol. kerosene at O:A 3:1.

This example confirms the extraction of $H_3PO_4$ at pilot scale (counter-current mixer-settlers, 5/L stage). Extraction of $H_3PO_4$ from filter grade $H_3PO_4$ was performed using an organic solvent containing 80% vol. TBP and 20% vol. kerosene. Two systems were tested: a five-stage counter-current setup and an eight-stage counter-current setup using an O:A ratio 3:1. FIGS. 16 and 17 show the extraction of $H_3PO_4$ in these two systems. During five stages, 0.92 M $H_3PO_4$ was loaded in the organic solvent, leaving about 2 M $H_3PO_4$ in the aqueous phase (FIG. 16). The efficiency increased with increasing the number of stages to eight: 1.4 M $H_3PO_4$ was extracted in 8 stages, leaving about 1.3 M $H_3PO_4$ in the aqueous phase (FIG. 17).

EXAMPLE 3

This example highlights the importance of the $(SiF_6)^{2-}$ treatment step (to prevent precipitation of $K_2SiF_6$ during stripping with $KH_2PO_4$ solution) and shows the stripping isotherm for $H_3PO_4$. Solvent (80% vol. TBP and 20% vol. kerosene) loaded with 1.25 M $H_3PO_4$ and 0.04 M F as $(SiF_6)^{2-}$ was stripped with 1.58 M $KH_2PO_4$ solution at four different O:A ratios, 1:1, 2:1, 5:1 and 10:1. In all instances, upon phase mixing, $(SiF_6)^{2-}$ precipitated as $K_2SiF_6$. The concentrations of $H_3PO_4$ in the aqueous and organic phases were plotted to obtain the distribution data (stripping isotherm, FIG. 18). The stripping yields for each O:A ratio tested are given in Table 1.

TABLE 1

$H_3PO_4$ stripping yields with 1.58M $KH_2PO_4$ solution at different O:A ratios. Solvent: 80% vol. TBP and 20% vol. kerosene loaded with 1.25M $H_3PO_4$.

| Stripping O:A ratio | H3PO4 stripping yield (%) |
|---|---|
| 1:1 | 94.4 |
| 2:1 | 82.9 |
| 5:1 | 54.3 |
| 10:1 | 34.4 |

Figure 18:
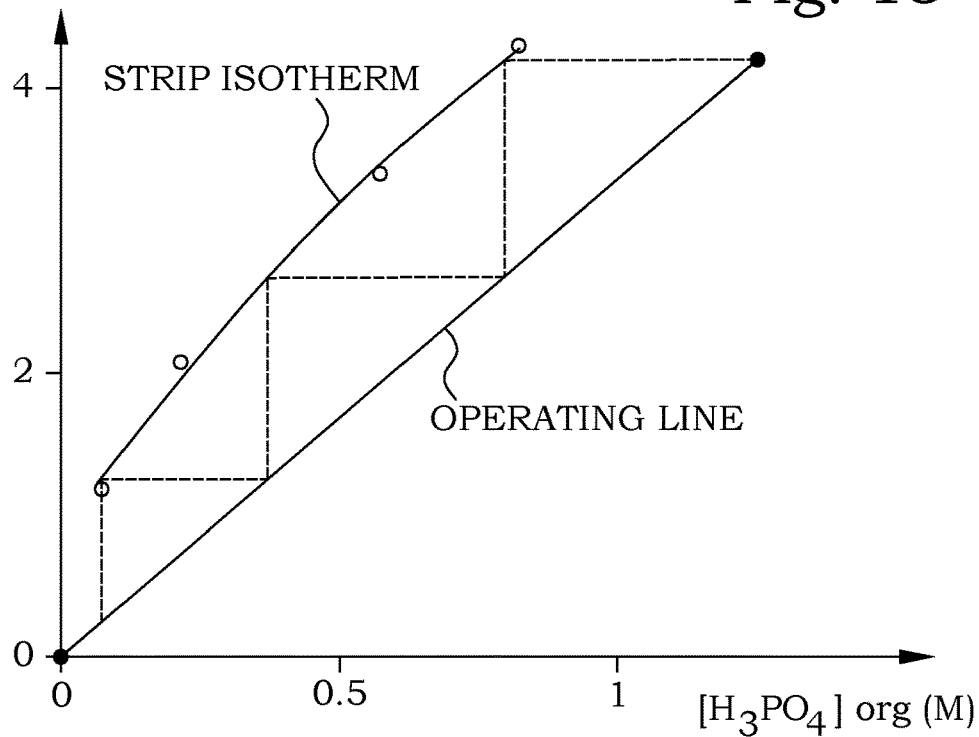
FIG. 18 is a diagram showing stripping of $H_3PO_4$ from 80% vol. TBP and 20% vol. kerosene loaded with 1.25 M $H_3PO_4$, using a strip solution of 1.58 M $KH_2PO_4$.

All $H_3PO_4$ in the organic phase can be effectively recovered in the $KH_2PO_4$ solution in four stages at O:A 3:1, as indicated by the McCabe Thiele diagram in FIG. 18. Using other O:A ratios and a different number of stages is, of course, possible.

EXAMPLE 4

This example presents two scenarios to remove $(SiF_6)^{2-}$ ions from the wet phosphoric acid solution by precipitation with either $Na_2CO_3$ or $K_2CO_3$. Filter grade phosphoric acid with approx. 28% $P_2O_5$ (40% $H_3PO_4$ or 4.85 M $H_3PO_4$), 7% $H_2SO_4$ (2.8 M) and 2% F (as $H_2SiF_6$) was used. Varying stoichiometric amounts of either $Na_2CO_3$ or $K_2CO_3$ were added to 100 mL acid. This was done with regards to Na/K and $(SiF_6)^{2-}$, e.g. 1:1 Na:$(SiF_6)^{2-}$ or 2:1 of K:$(SiF_6)^{2-}$. The resulting precipitate was filtered, dried and weighted. The results are presented in Table 2. Fluorosilicate ions could be removed with high efficiency by adding either $Na_2CO_3$ or $K_2CO_3$ to the acid, and filtration of the precipitated $Na_2SiF_6$/$K_2SiF_6$.

TABLE 2

Precipitation of $(SiF_6)^{2-}$ in wet $H_3PO_4$ by addition of $Na_2CO_3$ or $K_2CO_3$.

| Compound added | Ratio Na/K:$(SiF_6)^{2-}$ | Weight $Na_2CO_3$/$K_2CO_3$ added per 100 mL acid (g) | Precipitate weight (g) | F in filtrate (g/L) | F removal efficiency (%) |
|---|---|---|---|---|---|
| $Na_2CO_3$ | 1:1 | 2.20 | 3.08 | 13.50 | 58.3 |
| $Na_2CO_3$ | 2:1 | 4.40 | 5.85 | 1.32 | 95.9 |
| $Na_2CO_3$ | 3:1 | 6.59 | 5.55 | 0.20 | 99.4 |
| $Na_2CO_3$ | 6:1 | 13.19 | 6.81 | 0.11 | 99.7 |

TABLE 2-continued

Precipitation of $(SiF_6)^{2-}$ in wet $H_3PO_4$ by addition of $Na_2CO_3$ or $K_2CO_3$.

| Compound added | Ratio Na/K:$(SiF_6)^{2-}$ | Weight $Na_2CO_3$/$K_2CO_3$ added per 100 mL acid (g) | Precipitate weight (g) | F in filtrate (g/L) | F removal efficiency (%) |
|---|---|---|---|---|---|
| $K_2CO_3$ | 1:1 | 2.87 | 6.09 | 9.99 | 69.2 |
| $K_2CO_3$ | 2:1 | 5.73 | 6.68 | 0.12 | 99.6 |
| $K_2CO_3$ | 3:1 | 8.60 | 7.64 | 0.09 | 99.7 |
| $K_2CO_3$ | 6:1 | 17.20 | 12.54 | 0.05 | 99.8 |

EXAMPLE 5

Figure 19:
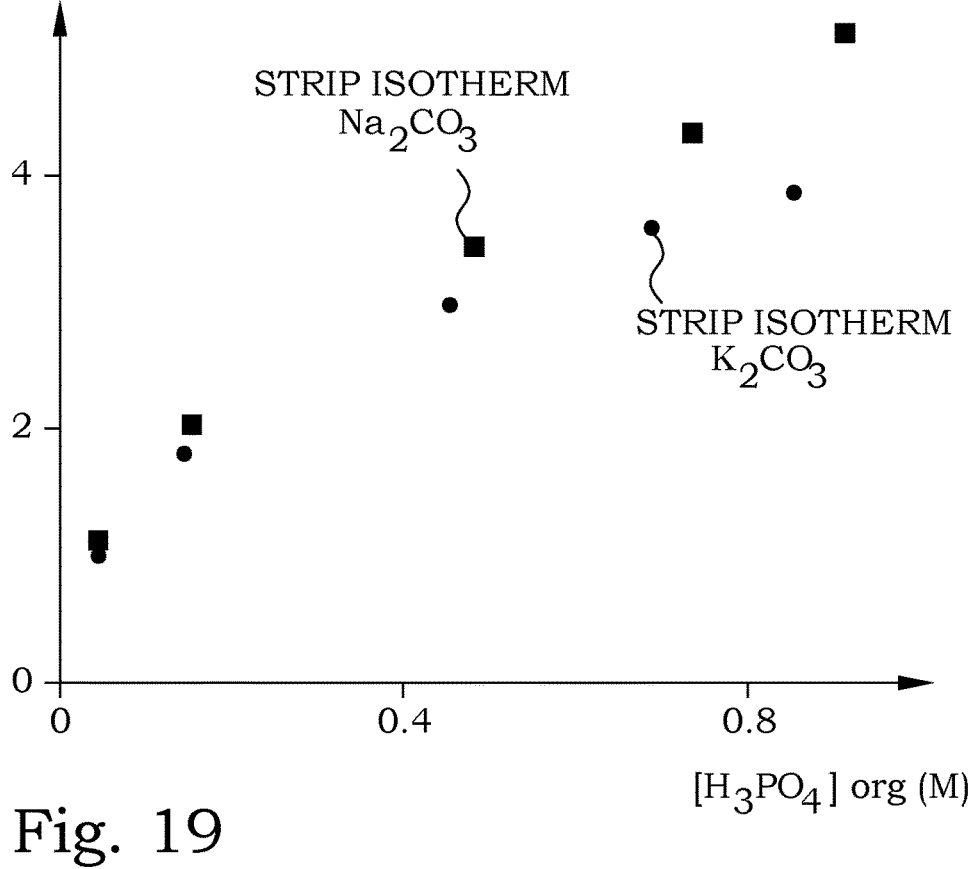
FIG. 19 is a diagram showing stripping of $H_3PO_4$ from 80% vol. TBP and 20% vol. kerosene loaded with $H_3PO_4$, using a strip solution: 1.58 M $KH_2PO_4$, and where the $H_3PO_4$ feed was treated with either $Na_2CO_3$ or $K_2CO_3$ to precipitate $(SiF_6)^{2-}$ prior to extraction and stripping, and where $H_3PO_4$ content in the organic/$Na_2CO_3$ system was 1.27 M and the $H_3PO_4$ content in the organic/$K_2CO_3$ system was 1.05 M.

This example shows that precipitation of $K_2SiF_6$ during stripping can be avoided if $(SiF_6)^{2-}$ is removed using either of the two approaches described in Example 4, and that the stripping process is not hindered by this treatment. $(SiF_6)^{2-}$ was removed from the wet acid stream prior to extracting $H_3PO_4$ with TBP using both approaches in Example 4. $Na_2CO_3$ was dosed 3 times the stoichiometric amount Na:$(SiF_6)^{2-}$. $K_2CO_3$ was dosed 2 times the stoichiometric amount K:$(SiF_6)^{2-}$. The precipitated $Na_2SiF_6$/$K_2SiF_6$ was filtered and the $H_3PO_4$ in the resulting solutions was extracted with 80% vol. TBP and 20% vol. kerosene. The organic phases (loaded with 1.05 M $H_3PO_4$ for the aqueous treated with $K_2CO_3$ and 1.27 M for the aqueous treated with $Na_2CO_3$) were stripped with 1.58 $KH_2PO_4$ solution at different O:A ratios (Table 3). No precipitation occurred at either O:A ratio. FIG. 19 shows the stripping isotherms for these two systems. The stripping yields were not affected by the $(SiF_6)^{2-}$ treatment step, as seen from the values in Table 3.

TABLE 3

$H_3PO_4$ stripping yields with 1.58M $KH_2PO_4$ solution for the systems where $(SiF_6)^{2-}$ was removed before the solvent extraction step with either $Na_2CO_3$ or $K_2CO_3$ precipitation. Solvent: 80% vol. TBP and 20% vol. kerosene loaded with 1.27M $H_3PO_4$ ($Na_2CO_3$ treatment) or 1.05M $H_3PO_4$ ($K_2CO_3$ treatment).

| Stripping O:A ratio | $H_3PO_4$ stripping yield (%) ($Na_2CO_3$ treatment) | $H_3PO_4$ stripping yield (%) ($K_2CO_3$ treatment) |
|---|---|---|
| 1:1 | 96.1 | 95.8 |
| 2:1 | 86.9 | 86.1 |
| 5:1 | 58.8 | 56.9 |
| 10:1 | 37.1 | 34.2 |
| 20:1 | 21.9 | 18.5 |

EXAMPLE 6

Other processes to remove $(SiF_6)^{2-}$ from 80% vol. TBP and 20% vol. kerosene containing 1.15 M $H_3PO_4$ and 0.04 M F as $(SiF_6)^{2-}$ were tested, as follows.

i) Solid $K_2CO_3$ was mixed with the organic solvent (20 g/L). This precipitated $(SiF_6)^{2-}$ as $K_2SiF_6$, which was removed. Subsequent stripping of the resulting organic phase was effectively carried out with 1.58 M $KH_2PO_4$ solution at O:A 3:1 without any precipitation occurring.

ii) similar to i above but using solid $KH_2PO_4$ instead (30 g/L). This also precipitated $K_2SiF_6$ and allowed, after removal of the precipitate, to carry out stripping with 1.58 M $KH_2PO_4$ solution at O:A 3:1 without any precipitation occurring.

iii) scrubbing of the organic solvent with water, e.g. contacting the solvent with water at high O:A ratios, 10:1 and 20:1. After removal of the scrub water, the resulting organic solvent was stripped with 1.58 M $KH_2PO_4$ solution at O:A 3:1. Precipitation of $K_2SiF_6$ occurred. The water scrub step removed some of the $H_3PO_4$ from the organic phase according to Table 4.

TABLE 4

Scrubbing of 80% vol. TBP and 20% vol. kerosene loaded with 1.15M $H_3PO_4$ using water at two O:A ratios, 10:1 and 20:1.

| Scrubbing O:A ratio | $H_3PO_4$ scrubbed (%) | $H_3PO_4$ concentration in the scrub solution (M) | $H_3PO_4$ concentration in the org (M) |
|---|---|---|---|
| 10:1 | 36 | 3.78 | 0.74 |
| 20:1 | 21 | 4.17 | 0.91 | iv) similar to iii above but using 1.58 M $KH_2PO_4$ scrub solution instead of water. Precipitation of $K_2SiF_6$ occurred during scrubbing. The precipitate and the scrub solution were removed, and the resulting scrubbed organic was subsequently stripped with 1.58 M $KH_2PO_4$ solution at O:A 3:1. Precipitation of $K_2SiF_6$ occurred but the amount precipitated was significantly lower compared to a reference sample where no $(SiF_6)^{2-}$ treatment was used.

v) stripping of the loaded solvent with 1.58 M $KH_2PO_4$ solution at 50° C. and O:A ratio 3:1. This significantly improved the phase disengagement time, but precipitation was noticed.

EXAMPLE 7

Precipitation of potassium phosphate was done by adding solid KOH to an organic solvent loaded with 1.18 M $H_3PO_4$. Two systems were tested: one in which the stoichiometric amount of solid KOH to form $KH_2PO_4$ was added; and another in which double this amount was used. In both cases, potassium phosphate precipitated with high yield (Table 5).

TABLE 5

Precipitation of potassium phosphate by dosing solid KOH to organic solvent containing 1.18M $H_3PO_4$.

| Stoichiometric amount dosed to precipitate $H_3PO_4$ as $KH_2PO_4$ | $H_3PO_4$ left in the solvent (M) | $H_3PO_4$ precipitated (%) |
|---|---|---|
| 2 | <0.0015 | 99.9 |
| 1 | 0.16 | 86.3 |

EXAMPLE 8

In this experiment, dipotassium phosphate solution ($K_2HPO_4$, 1.58 M) was generated by reacting almost saturated monopotassium phosphate solution ($KH_2PO_4$, 1.58 M) with KOH. The pH of the solution increased from 4.23 to 9.69. The reaction was exothermic; the temperature of the solution increased from 23° C. to 50° C. and no precipitation occurred.

EXAMPLE 9

Solid $KH_2PO_4$ crystals were precipitated from the strip product ($KH_2PO_4$, which contained 4 M $H_3PO_4$ and 0.5 M $H_2SO_4$; initial pH 0). 1.58 M $K_2HPO_4$ solution (see Example 8) was added to the strip product until the pH reached 4.65 (strip solution:$K_2HPO_4$ solution ratio 1:3.5). $KH_2PO_4$ crystals formed slowly but seeding with $KH_2PO_4$ crystals can be used to speed up the process. The solution was filtered the following day. The precipitation yield at this point was 82% (356 g crystals with 97% dry content per L strip product); precipitation was noticed to slowly continue in the filtrate. 621.2 mg of precipitate was dissolved in 10 mL deionized water and the solution was analysed using ICP-MS to confirm the composition and purity of the solid (Table 6). The crystals consisted of $KH_2PO_4$ (K:P=1.04, 99% of the mass). The filtrate was sampled at the time of filtration and analysed. Almost all the sulphate ions remained in the filtrate (Table 7).

TABLE 6

Analysis of the solution obtained by dissolving 621.2 mg precipitated $KH_2PO_4$ crystals in 10 mL deionized water.

| Chemical specie | Content in solution (g/L) | Content in solution (M) | Content in the crystals (% wt.) |
| --- | --- | --- | --- |
| K | 18.379 | 0.470 | 29.6 |
| P | 14.055 | 0.454 | |
| If $PO_4^{3-}$ | 43.095 | 0.454 | 69.4 |
| S | 0.037 | 0.0015 | |
| If $SO_4^{2-}$ | 0.11 | 0.0015 | 0.18 |
| Total | | | 99.18 |

TABLE 7

Analysis of K, P and S in the filtrate after precipitation of $KH_2PO_4$.

| Element | Content in solution (g/L) | Content in solution (M) |
| --- | --- | --- |
| K | 83.998 | 2.15 |
| P | 55.455 | 1.79 |
| S | 3.563 | 0.11 |

The embodiments described above are to be understood as a few illustrative examples of the present invention. It will be understood by those skilled in the art that various modifications, combinations and changes may be made to the embodiments without departing from the scope of the present invention. For example, parallel production of both mono-potassium phosphate and di-potassium phosphate according to the principles described above, production of di-potassium phosphate by reacting tri-potassium phosphate slurry with a strip solution composed of mono-potassium phosphate and phosphoric acid, and production of di-potassium phosphate in combination with stripping with a di-potassium phosphate solution in which the intermediate is mono-potassium phosphate. The scope of the present invention is, however, solely defined by the appended claims.

The invention claimed is:

1. A method for production of pure potassium phosphates, comprising the steps of:
    extracting phosphate from a feed liquid comprising phosphoric acid by a liquid-liquid extraction into a solvent;
    stripping said solvent of at least a part of said phosphate by a liquid-liquid extraction using a strip solution into a strip solution loaded with stripped phosphate;
    said strip solution being an aqueous potassium phosphate solution;
    separating said strip solution loaded with stripped phosphate and said solvent at least partially depleted in said phosphate;
    recirculate said solvent at least partly depleted in said phosphate for further extraction of said phosphate in said step of extracting;
    adding a potassium base into at least a partial stream of said strip solution loaded with stripped phosphate;
    cooling off heat generated when said potassium base is added into said at least a partial stream of said strip solution loaded with stripped phosphate;
    removing crystals from said strip solution loaded with stripped phosphate and added with said potassium base; and
    recirculating said strip solution after said step of removing crystals for use as input strip solution in said step of stripping.

2. The method according to claim 1, wherein said at least a partial stream of said strip solution loaded with stripped phosphate into which said potassium base is added is at least a partial stream after said step of removing crystals.

3. The method according to claim 2, further comprising a step of removing fluorosilicates.

4. The method according to claim 3, wherein said step of removing fluorosilicates comprises removing of said fluorosilicates from said feed liquid before said step of extracting said phosphate from said feed liquid.

5. The method according to claim 3, wherein said step of removing fluorosilicates comprises removing of said fluorosilicates from said solvent before said step of stripping said solvent.

6. The method according to claim 1, further comprising a step of removing fluorosilicates.

7. The method according to claim 6, wherein said step of removing fluorosilicates comprises removing of said fluorosilicates from said feed liquid before said step of extracting said phosphate from said feed liquid.

8. The method according to claim 6, wherein said step of removing fluorosilicates comprises removing of said fluorosilicates from said solvent before said step of stripping said solvent.

9. The method according to claim 1, wherein said solvent processed in said step of stripping said solvent has a fluorosilicate content of below 0.3 M.

10. The method according to claim 1, wherein said potassium phosphate in said strip solution is monopotassium phosphate, and further comprising the steps of:
    maintaining a temperature of said strip solution loaded with stripped phosphate below a saturation temperature for monopotassium phosphate;
    mixing a dipotassium phosphate solution into at least a partial stream of said strip solution loaded with stripped phosphate;
    causing crystals of monopotassium phosphate to precipitate from a saturated monopotassium phosphate solution;

said step of removing crystals comprising separating said crystals of monopotassium phosphate.

11. The method according to claim 10, further comprising the steps of:
adding said potassium base into said at least a partial stream of said strip solution loaded with stripped phosphate, forming a solution comprising dipotassium phosphate;
returning said solution comprising dipotassium phosphate to said strip solution loaded with stripped phosphate.

12. The method according to claim 1, wherein said step of adding of said potassium base is performed to add an amount of substance of potassium in dependence of an amount of substance of stripped phosphate in said strip solution after said stripping.

* * * * *